(12) United States Patent
Wang et al.

(10) Patent No.: US 11,360,558 B2
(45) Date of Patent: Jun. 14, 2022

(54) COMPUTER SYSTEMS WITH FINGER DEVICES

(71) Applicant: Apple Inc., Cupertino, CA (US)

(72) Inventors: Paul X. Wang, Cupertino, CA (US); Nicolai Georg, Sunnyvale, CA (US); Benjamin R. Blachnitzky, San Francisco, CA (US); Alhad A. Palkar, San Jose, CA (US); Minhazul Islam, Cupertino, CA (US); Alex J. Lehmann, Sunnyvale, CA (US); Madeleine S. Cordier, San Francisco, CA (US); Joon-Sup Han, Sunnyvale, CA (US); Hongcheng Sun, San Ramon, CA (US); Sang E. Lee, Sunnyvale, CA (US); Kevin Z. Lo, Belmont, CA (US); Lilli Ing-Marie Jonsson, Saratoga, CA (US); Luis Deliz Centeno, Oakland, CA (US); Yuhao Pan, Sunnyvale, CA (US); Stephen E. Dey, San Francisco, CA (US); Paul N. DuMontelle, Mountain View, CA (US); Jonathan C. Atler, Cupertino, CA (US); Tianjia Sun, Santa Clara, CA (US); Jian Li, Cupertino, CA (US); Chang Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/395,806

(22) Filed: Apr. 26, 2019

(65) Prior Publication Data

US 2020/0026352 A1 Jan. 23, 2020

Related U.S. Application Data

(60) Provisional application No. 62/699,642, filed on Jul. 17, 2018.

(51) Int. Cl.
*G09G 5/00* (2006.01)
*G06F 3/01* (2006.01)
(Continued)

(52) U.S. Cl.
CPC ............. *G06F 3/014* (2013.01); *G06F 3/013* (2013.01); *G06F 3/016* (2013.01); *G06F 3/017* (2013.01);
(Continued)

(58) Field of Classification Search
CPC .......... G06F 3/014; G06F 3/017; G06F 3/013; G06F 3/04883; G06F 3/0482;
(Continued)

(56) References Cited

U.S. PATENT DOCUMENTS 6,128,004 A 10/2000 McDowall et al.
8,086,971 B2 12/2011 Radivojevic et al.
(Continued)

FOREIGN PATENT DOCUMENTS

CN 1273649 A 11/2000
CN 103677272 A 3/2014
(Continued)

*Primary Examiner* — Adam R. Giesy
(74) *Attorney, Agent, or Firm* — Treyz Law Group, P.C.; G. Victor Treyz; David K. Cole

(57) ABSTRACT

A system may include finger devices. A touch sensor may be mounted in a finger device housing to gather input from an external object as the object moves along an exterior surface of the housing. The touch sensor may include capacitive sensor electrodes. Sensors such as force sensors, ultrasonic sensors, inertial measurement units, optical sensors, and other components may be used in gathering finger input from a user. Finger input from a user may be used to manipulate virtual objects in a mixed reality or virtual reality environment while a haptic output device in a finger device provides associated haptic output. A user may interact with (Continued)

real-world objects while computer-generated content is overlaid over some or all of the objects. Object rotations and other movements may be converted into input for a mixed reality or virtual reality system using force measurements or other sensors measurements made with the finger devices.

42 Claims, 21 Drawing Sheets

(51) Int. Cl.
- *G06T 19/00* (2011.01)
- *G06F 3/04883* (2022.01)
- *G06F 3/0482* (2013.01)
- *G06F 3/044* (2006.01)
- *G06F 3/04815* (2022.01)
- *G06F 3/038* (2013.01)

(52) U.S. Cl.
CPC .............. *G06F 3/038* (2013.01); *G06F 3/044* (2013.01); *G06F 3/0482* (2013.01); *G06F 3/04815* (2013.01); *G06F 3/04883* (2013.01); *G06T 19/006* (2013.01); *G06F 2203/0331* (2013.01)

(58) Field of Classification Search
CPC ...... G06F 3/044; G06F 3/016; G06F 3/03547; G06F 3/011; G06F 3/038; G06F 2203/0331; G06F 3/0346; G06F 3/0426; G06F 3/04815; G06F 3/04886; G06T 19/006

See application file for complete search history.

(56) References Cited

U.S. PATENT DOCUMENTS

| | | | |
|---|---|---|---|
| 9,110,505 B2 | 8/2015 | Mastandrea | |
| 2003/0025721 A1 | 2/2003 | Clapper et al. | |
| 2003/0214481 A1 | 11/2003 | Xiong | |
| 2006/0001646 A1* | 1/2006 | Hai | G06F 3/014 345/156 |
| 2008/0036732 A1 | 2/2008 | Wilson et al. | |
| 2008/0059131 A1 | 3/2008 | Tokita et al. | |
| 2008/0226134 A1* | 9/2008 | Stetten | G06F 3/016 382/114 |
| 2009/0096746 A1 | 4/2009 | Kruse et al. | |
| 2009/0153365 A1 | 6/2009 | Salsedo et al. | |
| 2012/0249797 A1* | 10/2012 | Haddick | G06F 3/016 348/158 |
| 2015/0227203 A1 | 8/2015 | Chen et al. | |
| 2015/0277559 A1 | 10/2015 | Vescovi et al. | |
| 2015/0316980 A1 | 11/2015 | Miller | |
| 2016/0077582 A1* | 3/2016 | Song | G06F 3/0338 345/173 |
| 2016/0209648 A1 | 7/2016 | Haddick et al. | |
| 2016/0209920 A1* | 7/2016 | Mastandrea | G06F 3/03547 |
| 2016/0278665 A1* | 9/2016 | Ferreira | A61B 5/0053 |
| 2017/0205880 A1 | 7/2017 | Osman | |
| 2017/0212589 A1* | 7/2017 | Domenikos | G06F 3/016 |

FOREIGN PATENT DOCUMENTS

| | | |
|---|---|---|
| WO | 2004044664 A1 | 5/2004 |
| WO | 2009048662 A1 | 4/2009 |
| WO | 2019/005586 A1 | 1/2019 |

* cited by examiner

COMPUTER SYSTEMS WITH FINGER DEVICES

This application claims the benefit of provisional patent application No. 62/699,642, filed Jul. 17, 2018, which is hereby incorporated by reference herein in its entirety.

FIELD

This relates generally to electronic devices, and, more particularly, to sensors for finger-mounted electronic devices.

BACKGROUND

Electronic devices such as computers can be controlled using computer mice and other input accessories. In virtual reality systems, force-feedback gloves can be used to control virtual objects. Cellular telephones may have touch screen displays and vibrators that are used to create haptic feedback in response to touch input.

Devices such as these may not be convenient for a user, may be cumbersome or uncomfortable, or may provide inadequate feedback.

SUMMARY

A system may include finger devices. A head-mounted device or other device with a display may display virtual content that is overlaid on real-world content.

A touch sensor may be mounted in a finger device housing to gather input from an external object as the object moves along an exterior surface of the housing. The external object may be, for example, the tip of finger other than a finger received within the finger device.

The touch sensor on a finger device may include a one-dimensional or two-dimensional array of sensor elements. The sensor elements may be capacitive sensor electrodes or touch sensor elements based on optical sensing, ultrasonic sensing, or other types of sensing. In some arrangements, optical sensors, ultrasonic sensors, or other sensors that are mounted in a finger device housing may be configured to gather touch input from an area of a user's finger that is adjacent to the finger device and that is not overlapped by the finger device.

Sensors such as force sensors, ultrasonic sensors, inertial measurement units, optical sensors, and other components in the finger devices may be used in gathering finger input from a user as the user is viewing virtual content presented with the head-mounted device or other electronic equipment.

Finger input from a user may be used to manipulate virtual objects. For example, a virtual object corresponding to a movable control can be moved by a user based on finger input gathered using a finger device or a displayed menu option can be selected. In some arrangements, a user may interact with real-world objects while computer-generated content is overlaid over some or all of the objects. Rotation of a real-world object and other interactions with a real-world object and the virtual content overlaid on the real-world object may be used as input for controlling the operation of a mixed reality system or other electronic equipment.

DETAILED DESCRIPTION

Figure 1:
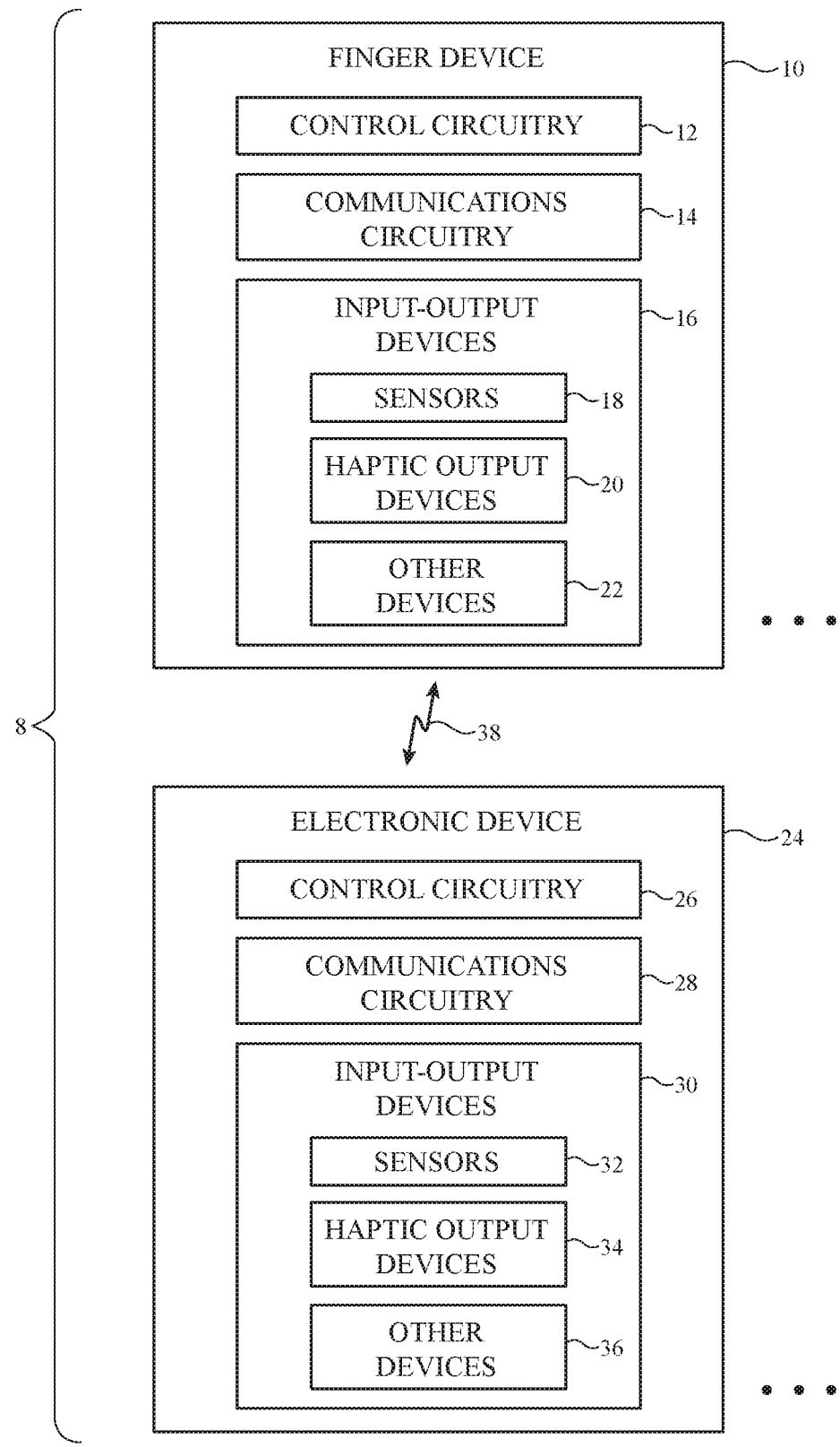
FIG. 1 is a schematic diagram of an illustrative system with a finger device in accordance with an embodiment.

Electronic devices that are configured to be mounted on the body of a user may be used to gather user input and to provide a user with output. For example, electronic devices that are configured to be worn on one or more of a user's fingers, which are sometimes referred to as finger devices or finger-mounted devices, may be used to gather user input and to supply output. A finger device may, as an example, include an inertial measurement unit with an accelerometer for gathering information on figure motions such as finger taps or free-space finger gestures, may include force sensors for gathering information on normal and shear forces in the finger device and the user's finger, and may include other sensors for gathering information on the interactions between the finger device (and the user's finger on which the device is mounted) and the surrounding environment. The finger device may include a haptic output device to provide the user's finger with haptic output and may include other output components.

One or more finger devices may gather user input from a user. The user may use finger devices in operating a virtual reality or mixed reality device (e.g., head-mounted equipment such as glasses, goggles, a helmet, or other device with a display). During operation, the finger devices may gather user input such as information on interactions between the finger device(s) and the surrounding environment (e.g., interactions between a user's fingers and the environment, including finger motions and other interactions associated with virtual content displayed for a user). The user input may be used in controlling visual output on the display. Corresponding haptic output may be provided to the user's fingers using the finger devices. Haptic output may be used, for example, to provide the fingers of a user with a desired texture sensation as a user is touching a real object or as a user is touching a virtual object. Haptic output can also be used to create detents and other haptic effects.

Finger devices can be worn on any or all of a user's fingers (e.g., the index finger, the index finger and thumb, three of a user's fingers on one of the user's hands, some or all fingers on both hands, etc.). To enhance the sensitivity of a user's touch as the user interacts with surrounding objects, finger devices may have inverted U shapes or other configurations that allow the finger devices to be worn over the top and sides of a user's finger tips while leaving the user's finger pads exposed. This allows a user to touch objects with the finger pad portions of the user's fingers during use. If desired, finger devices may be worn over knuckles on a user's finger, between knuckles, and/or on other portions of a user's finger. The use of finger devices on a user's finger tips is sometimes described herein as an example.

Users can use the finger devices to interact with any suitable electronic equipment. For example, a user may use one or more finger devices to interact with a virtual reality or mixed reality system (e.g., a head-mounted device with a display), to supply input to a desktop computer, tablet computer, cellular telephone, watch, ear buds, or other accessory, or to interact with other electronic equipment.

FIG. 1 is a schematic diagram of an illustrative system of the type that may include one or more finger devices. As shown in FIG. 1, system 8 may include electronic device(s) such as finger device(s) 10 and other electronic device(s) 24. Each finger device 10 may be worn on a finger of a user's hand. Additional electronic devices in system 8 such as devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10 is a finger-mounted device having a finger-mounted housing with a U-shaped body that grasps a user's finger or a finger-mounted housing with other shapes configured to rest against a user's finger and device(s) 24 is a cellular telephone, tablet computer, laptop computer, wristwatch device, head-mounted device, a device with a speaker, or other electronic device (e.g., a device with a display, audio components, and/or other output components). A finger device with a U-shaped housing may have opposing left and right sides that are configured to receive a user's finger and a top housing portion that couples the left and right sides and that overlaps the user's fingernail.

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 26, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 24 may include sensors 32. Sensors 18 and/or 32 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors (e.g., ultrasonic sensors for tracking device orientation and location and/or for detecting user input such as finger input), and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG) for detecting finger actions, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors. In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or finger device or other suitable rotary button that rotates and that optionally can be depressed to select items of interest). Alphanumeric keys and/or other buttons may be included in devices 16 and/or 30. In some configurations, sensors 18 may include joysticks, roller balls, optical sensors (e.g., lasers that emit light and image sensors that track motion by monitoring and analyzing changings in the speckle patterns and other information associated with surfaces illuminated with the emitted light as device 10 is moved relative to those surfaces), fingerprint sensors, and/or other sensing circuitry. Radio-frequency tracking devices may be included in sensors 18 to detect location, orientation, and/or range. Beacons (e.g., radio-frequency beacons) may be used to emit radio-frequency signals at different locations in a user's environment (e.g., at one or more registered locations in a user's home or office). Radio-frequency beacon signals can be analyzed by devices 10 and/or 24 to help determine the location and position of devices 10 and/or 24 relative to the beacons. If desired, devices 10 and/or 24 may include beacons. Frequency strength (received signal strength information), beacon orientation, time-of-flight information, and/or other radio-frequency information may be used in determining orientation and position information. At some frequencies (e.g., lower frequencies such as frequencies below 10 GHz), signal strength information may be used, whereas at other frequencies (e.g., higher frequencies such as frequencies above 10 GHz), indoor radar schemes may be used). If desired, light-based beacons, ultrasonic beacons, and/or other beacon devices may be used in system 8 in addition to or instead of using radio-frequency beacons and/or radio-frequency radar technology.

Devices 16 and/or 30 may include haptic output devices 20 and/or 34. Haptic output devices 20 and/or 34 can produce motion that is sensed by the user (e.g., through the user's fingertips). Haptic output devices 20 and/or 34 may include actuators such as electromagnetic actuators, motors, piezoelectric actuators, electroactive polymer actuators, vibrators, linear actuators (e.g., linear resonant actuators), rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used in squeezing a user's finger and/or otherwise directly interacting with a user's finger pulp. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as displays (e.g., in device 24 to display images for a user), status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals.

Figure 2:
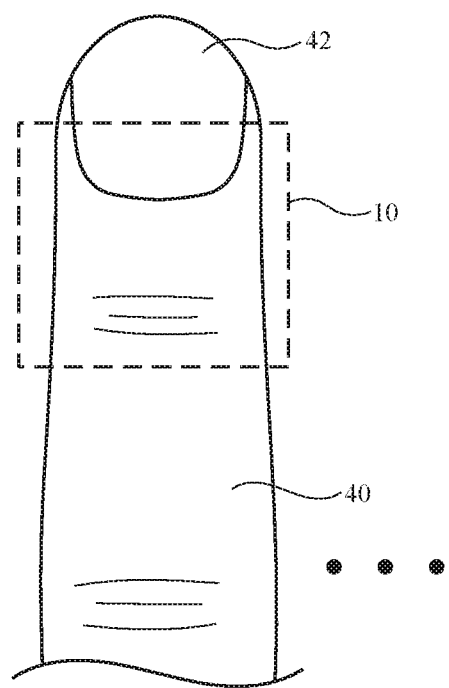
FIG. 2 is a top view of an illustrative finger of a user on which a finger device has been placed in accordance with an embodiment.

FIG. 2 is a top view of a user's finger (finger 40) and an illustrative finger-mounted device 10. As shown in FIG. 2, device 10 may be formed from a finger-mounted unit that is mounted on or near the tip of finger 40 (e.g., partly or completely overlapping fingernail 42). If desired, device 10 may be worn elsewhere on a user's fingers such as over a knuckle, between knuckles, etc. Configurations in which a device such as device 10 is worn between fingers 40 may also be used.

A user may wear one or more of devices 10 simultaneously. For example, a user may wear a single one of devices 10 on the user's ring finger or index finger. As another example, a user may wear a first device 10 on the user's thumb, a second device 10 on the user's index finger, and an optional third device 10 on the user's middle finger. Arrangements in which devices 10 are worn on other fingers and/or all fingers of one or both hands of a user may also be used.

Control circuitry 12 (and, if desired, communications circuitry 14 and/or input-output devices 16) may be contained entirely within device 10 (e.g., in a housing for a fingertip-mounted unit) and/or may include circuitry that is coupled to a fingertip structure (e.g., by wires from an associated wrist band, glove, fingerless glove, etc.). Configurations in which devices 10 have bodies that are mounted on individual user fingertips are sometimes described herein as an example.

Figure 3:
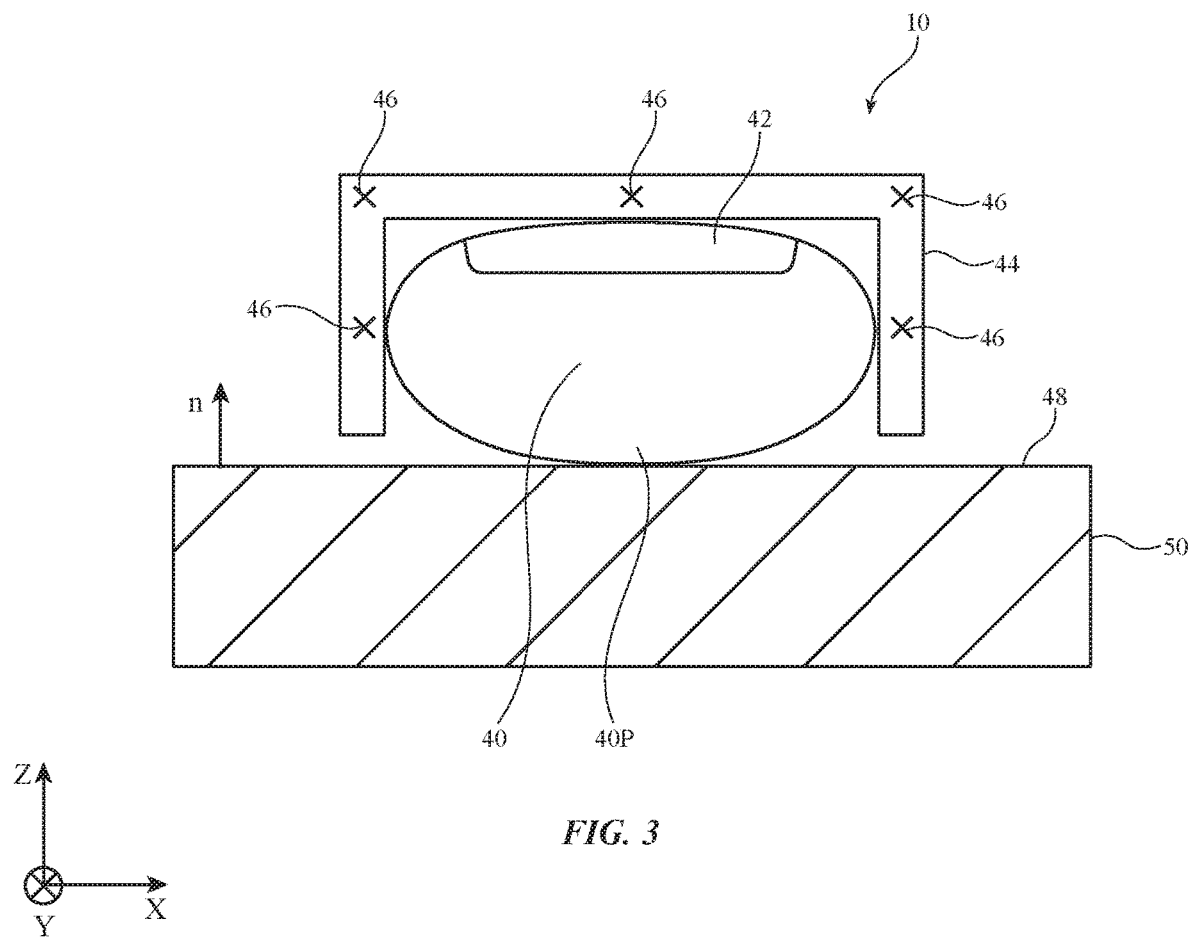
FIG. 3 is a cross-sectional side view of an illustrative finger device on the finger of a user in accordance with an embodiment.

FIG. 3 is a cross-sectional side view of an illustrative finger device (finger-mounted device) 10 showing illustrative mounting locations 46 for electrical components (e.g., control circuitry 12, communications circuitry 14, and/or input-output devices 16 such as sensors 18, haptic output devices 20, and/or other devices 22) within and/or on the surface(s) of finger device housing 44. These components may, if desired, be incorporated into other portions of housing 44.

As shown in FIG. 3, housing 44 may have a U shape (e.g., housing 44 may be a U-shaped housing structure that faces downwardly and covers the upper surface of the tip of user finger 40 and fingernail 42). During operation, a user may press against structures such as structure 50. As the bottom of finger 40 (e.g., finger pulp 40P) presses against surface 48 of structure 50, the user's finger may compress and force portions of the finger outwardly against the sidewall portions of housing 44 (e.g., for sensing by force sensors or other sensors mounted to the side portions of housing 44). Lateral movement of finger 40 in the X-Y plane may also be sensed using force sensors or other sensors on the sidewalls of housing 44 or other portions of housing 44 (e.g., because lateral movement will tend to press portions of finger 40 against some sensors more than others and/or will create shear forces that are measured by force sensors that are configured to sense shear forces).

Ultrasonic sensors, optical sensors, inertial measurement units, strain gauges and other force sensors, radio-frequency sensors, and/or other sensors may be used in gathering sensor measurements indicative of the activities of finger 40. If desired, these sensors may also be used in mapping the contours of three-dimensional objects (e.g., by time-of-flight measurements and/or other measurements). For example, an ultrasonic sensor such as a two-dimensional image sensor or an ultrasonic sensor with a single ultrasonic transducer element may emit free-space ultrasonic sound signals that are received and processed after reflecting off of external objects. This allows a three-dimensional ultrasonic map to be generated indicating the shapes and locations of the external objects.

In some configurations, finger activity information (position, movement, orientation, etc.) may be gathered using sensors that are mounted in external electronic equipment (e.g., in a computer or other desktop device, in a head-mounted device or other wearable device, and/or in other electronic device 24 that is separate from device 10). For example, optical sensors such as images sensors that are separate from devices 10 may be used in monitoring devices 10 to determine their position, movement, and/or orientation. If desired, devices 10 may include passive and/or active optical registration features to assist an image sensor in device 24 in tracking the position, orientation, and/or motion of device 10. For example, devices 10 may include light-emitting devices such as light-emitting diodes and/or lasers. The light-emitting devices may include light-emitting diodes, lasers (e.g., laser diodes, vertical cavity surface-emitting lasers, etc.), or other light sources and may operate at visible wavelengths, ultraviolet wavelengths, and/or infrared wavelengths. The light-emitting devices may be arranged in an asymmetric pattern on housing 44 and may emit light that is detected by an image sensor, depth sensor, and/or other light-based tracking sensor circuitry in device 24 (e.g., a head-mounted device, desktop computer, stand-alone camera-based monitoring systems, and/or other electrical equipment with an image sensor or other tracking sensor circuitry). By processing the received patterned of emitted light, device 24 can determine the position, orientation, and/or motion of device 10. If desired, the light-emitting devices can be removable and/or customizable (e.g., a user can customize the location and type of light-emitting devices).

Tracking can also be performed that involves extrapolating from a known body part orientation (e.g., a finger orientation) to produce orientation information on other body parts (e.g., wrist and/or arm orientation estimated using inverse kinematics). Visual odometry sensors may, if desired, be included in devices 10. These sensors may include image sensors that gather frames of image data of the surroundings of devices 10 and may be used in measuring position, orientation, and/or motion from the frame of image data. Lidar, ultrasonic sensors oriented in multiple directions, radio-frequency tracking sensors, and/or other finger device tracking arrangements may be used, if desired. In some arrangements, user input for controlling system 8 can include both user finger input and other user input (e.g., user eye gaze input, user voice input, etc.). For example, gaze tracking information such as a user's point-of-gaze measured with a gaze tracker can be fused with finger input when controlling device 10 and/or devices 24 in system 8. A user may, for example, gaze at an object of interest while using device 10 using one or more of sensors 18 (e.g., an accelerometer, force sensor, touch sensor, etc.) to gather information such as tap input (movement of device 10 resulting in measurable forces and/or accelerometer output when device 10 strikes a table top or other external surface), double-tap input, force input, multi-finger gestures (taps, swipes, and/or other gestures on external surfaces and/or the housing surfaces of multiple devices 10), drag and drop operations associated with objects selected using a lingering gaze or other point-of-gaze input, etc. The finger input may include information on finger orientation, position, and/or motion and may include information on how forcefully a finger is pressing against surfaces (e.g., force information). Finger pointing input (e.g., the direction of finger pointing) may be gathered using radio-frequency sensors among sensors 18 and/or other sensors in device(s) 10.

If desired, user input may include air gestures (sometimes referred to as three-dimensional gestures or non-contact gestures) gathered with sensors 18 (e.g., proximity sensors, image sensors, ultrasonic sensors, radio-frequency sensors, etc.). Air gestures (e.g., non-contact gestures in which a user's fingers hover and/or move relative to the sensors 18 of device 10 and/or in which device 10 hovers and/or moves relative to external surfaces) and/or touch and/or force-based input may include multifinger gestures (e.g., pinch to zoom, etc.). In some embodiments, a user may wear multiple devices 10 (e.g., on a thumb and index finger) and these devices may be used to gather finger pinch input such as pinch click gesture input or pinch force input. For example, a pinch click input may be detected when a tap (e.g., a peak in an accelerometer output signal) for a thumb device correlates with a tap for an index finger device and/or pinch force input may be gathered by measuring strain gauge output with strain gauges in devices 10 as the devices 10 press against each other. Pinch force can also be detected by measuring the size of the contact patch produced when a finger presses against a two-dimensional touch sensor (larger contact area being associated with larger applied force).

By correlating user input from a first of devices 10 with user input from a second of devices 10 and/or by otherwise analyzing finger device sensor input, pinch gestures (e.g., pinch click or pinch tap gestures and/or pinch force input) and other multi-device input may be detected and used in manipulating virtual objects or taking other actions in system 8. Consider, as an example, the use of a pinch gesture to select a virtual object associated with a user's current point-of-gaze. Once the virtual object has been selected based on the direction of the user's point-of-gaze (or finger point direction input) and based on the pinch gesture input or other user input, further user input gathered with one or more devices 10 may be used to rotate and/or otherwise manipulate the virtual object. For example, information on finger movement (e.g., rotational movement) may be gathered using an internal measurement unit or other sensor 18 in device(s) 10 and this rotational input used to rotate the selected object. In some scenarios, an object may be selected based on point-of-gaze (e.g., when a user's point-of-gaze is detected as being directed toward the object) and, following selection, object attributes (e.g., virtual object attributes such as virtual object appearance and/or real-world object attributes such as the operating settings of a real-world device) can be adjusted using strain gauge or touch sensor contact patch pinch input (e.g., detected pinch force between finger devices 10 that are being pinched together on opposing fingers) and/or can be adjusted using finger device orientation input (e.g., to rotate a virtual object, etc.).

If desired, gestures such as air gestures (three-dimensional gestures) may involve additional input. For example, a user may control system 8 using hybrid gestures that involve movement of device(s) 10 through the air (e.g., an air gesture component) and that also involve contact (and, if desired, movement) of a thumb or other finger against a two-dimensional touch sensor, force sensor, or other sensor 18. As an example, an inertial measurement unit may detect user movement of finger 40 through the air (e.g., to trace out a path) while detecting force input, touch input, or other input (e.g., finger pinch input or other input to adjust a line or other virtual object that is being drawn along the path).

The sensors in device 10 may, for example, measure how forcefully a user is moving device 10 (and finger 40) against surface 48 (e.g., in a direction parallel to the surface normal n of surface 48 such as the −Z direction of FIG. 3) and/or how forcefully a user is moving device 10 (and finger 40) within the X-Y plane, tangential to surface 48. The direction of movement of device 10 in the X-Y plane and/or in the Z direction can also be measured by the force sensors and/or other sensors 18 at locations 46.

Structure 50 may be a portion of a housing of device 24, may be a portion of another device 10 (e.g., another housing 44), may be a portion of a user's finger 40 or other body part, may be a surface of a real-world object such as a table, a movable real-world object such as a bottle or pen, or other inanimate object external to device 10, and/or may be any other structure that the user can contact with finger 40 while moving finger 40 in a desired direction with a desired force. Because motions such as these can be sensed by device 10, device(s) 10 can be used to gather pointing input (e.g., input moving a cursor or other virtual object on a display such as a display in devices 36), can be used to gather tap input, swipe input, pinch-to-zoom input (e.g., when a pair of devices 10 is used), or other gesture input (e.g., finger gestures, hand gestures, arm motions, etc.), and/or can be used to gather other user input.

Figure 4:
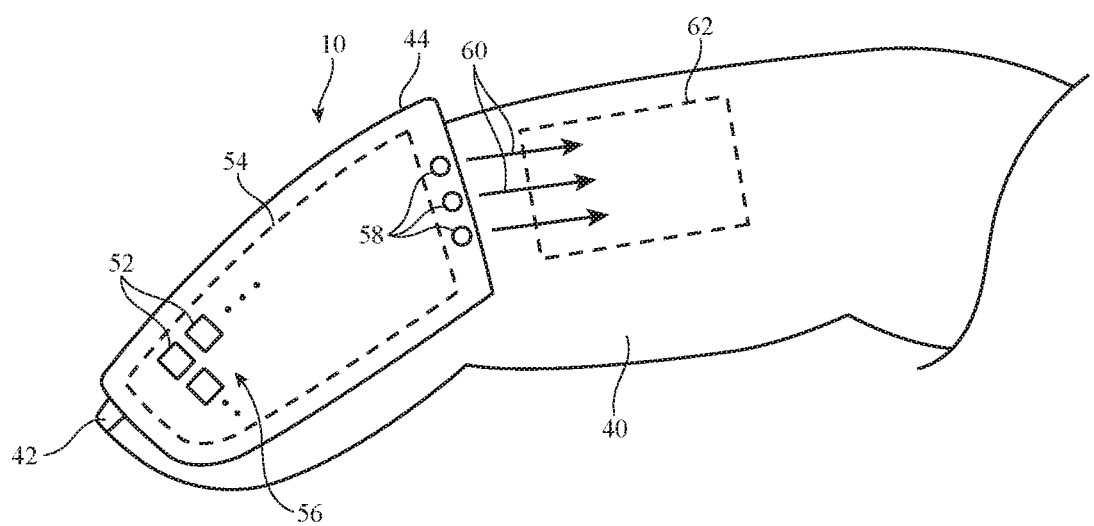
FIG. 4 is a side view of an illustrative finger device that gathers input from an adjacent area on a finger that is not covered by the finger device in accordance with an embodiment.

FIG. 4 is a side view of an illustrative finger device on a finger of a user. In the illustrative configuration of FIG. 4, device 10 includes touch sensor 56. Touch sensor 56 may be formed from an array of capacitive touch sensor electrodes such as electrodes 52 overlapping the side and/or top surfaces of housing 44. Touch sensor 56 may be used to gather touch input such as input from direct contact and/or close proximity with a different finger of the user or other external object. In the example of FIG. 4, touch sensor 56 may overlap touch input area 54 on the side(s) of device 10. If desired, additional touch input may be gathered in adjacent areas such as touch input area 62 on the exposed side of finger 40 adjacent to device 10. Touch input may be gathered from area 62 using sensors in device 10 that are directed towards area 62. These sensors may be, for example, capacitive sensors, optical sensors, ultrasonic sensors, and/or other sensors that can monitor area 62 (see, e.g., sensors 58). With one illustrative configuration, sensors 58 are optical sensors having light emitters (e.g., light-emitting diodes or lasers) that emit light 60 overlapping area 62 and having light detectors (e.g., photodiodes) that measure reflected light from a user's finger or other external object in area 62. In this way, the area covered by the touch sensor circuitry of device 10 can extend across both portions of housing 44 and portions of adjacent body parts such as area 62 on finger 40.

Figure 5:
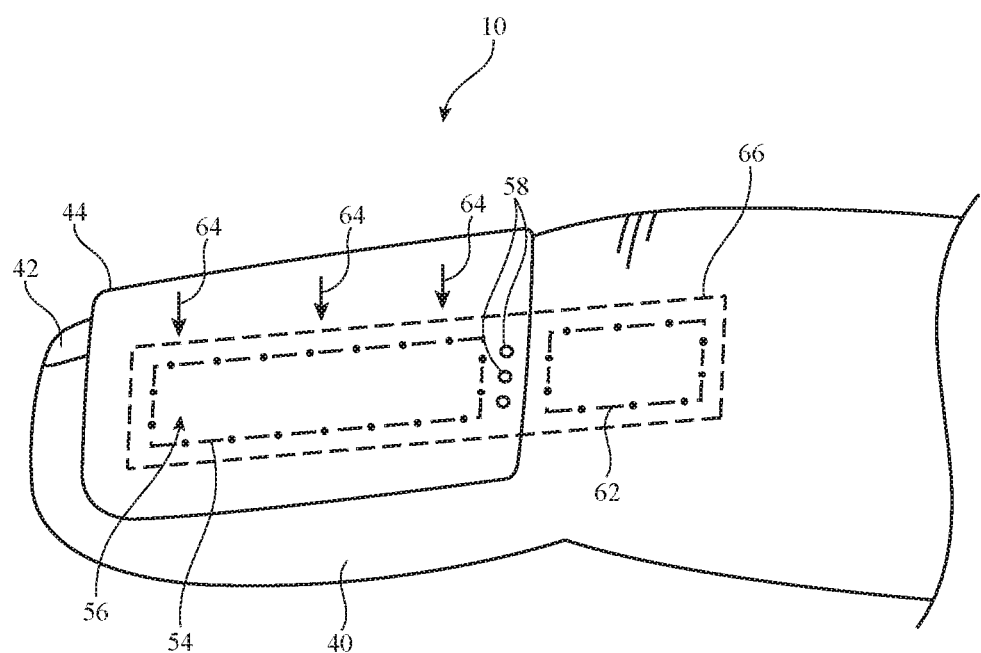
FIG. 5 is a side view of an illustrative finger device showing how virtual content may be overlaid on the surface the device and an adjacent finger surface in accordance with an embodiment.

System 8 may have head-mounted display devices or other devices that present mixed reality content to a user. In a mixed reality environment, virtual content (e.g., computer-generated content from control circuitry in system 8) may be overlaid on real-world content (e.g., real-world images obtained from directly viewing the real world through an optical coupler and/or real-world images obtained with a front-facing camera or other image sensor that is operated in a pass-through mode to provide real-world images on a display for the user. The mixed reality content of system 8 may, as an example, include icons and other computer-generated visual content (sometimes referred to as virtual content) that is overlaid over areas that gather user input (e.g., touch input). Consider, as an example, the scenario of FIG. 5. In this example, a user is wearing finger device 10 on finger 40. Touch sensor 56 is formed in device 10 (e.g., in housing 44) and gathers touch sensor input in area 54 on the outer surface of housing 44. Optical sensors 58 gather touch input from area 62 on finger 40 adjacent to device 10. The user may be viewing finger 40 and device 10 through a mixed reality head-mounted device (see, e.g., device 24 of FIG. 1). The mixed reality device may present computer-generated content (virtual content generated by device 24) that overlaps real-world content in virtual content area 66.

The virtual content in area 66 may include, for example, selectable icons corresponding to functions (e.g., functions performed by application software and/or operating system software) that a user may invoke by supplying corresponding touch input. For example, device 24 may be a mixed reality head-mounted device that presents a selectable calendar icon in area 66. When the user uses a free finger other than the finger on which device 10 is being worn to touch the calendar icon in area 66, this touch input will be detected by touch sensor 56 or optical sensors 58, depending on the portion of area 66 in which the calendar item was presented. In response to user touch input selection of the calendar icon, control circuitry in device 24 can take suitable action such as launching a calendar application and presenting content for the launched calendar application visually using the display in device 24 (e.g., as an overlay over an image of the real world). If desired, free-form touch input may be gathered (e.g., a user may trace the shape of an alphanumeric character in area 66 that serves as an input command). Haptic output may be provided by device 10 in response to the received touch input.

As another example, a volume slider or other sliding control icon may be displayed in region 66. As the user's finger points at and overlaps the sliding control icon, the sliding control icon is selected. The user can then slide the user's finger back and forth in region 66 to adjust the slider. If desired, haptic output (e.g., a click) can be provided in response to selection and/or movement of the control icon. For example, haptic output detents (vibrations that are supplied when the user's finger position coincides with predetermined locations 64) may be supplied during user finger interactions in area 66. In some arrangements, an icon (e.g., a dot, a glowing dot, a blinking dot, a finger icon, a movable line, etc.) may be used to depict a finger location in region 66. In general, any suitable content may be displayed in areas such as area 66 (e.g., areas that overlap all or part of device 10, areas that overlap all or part of finger 40, and/or other areas that overlap real-world objects). This content may include still and/or moving images containing text, graphics, photographs, real-world video, moving animations, icons, and/or other content).

Figure 6:
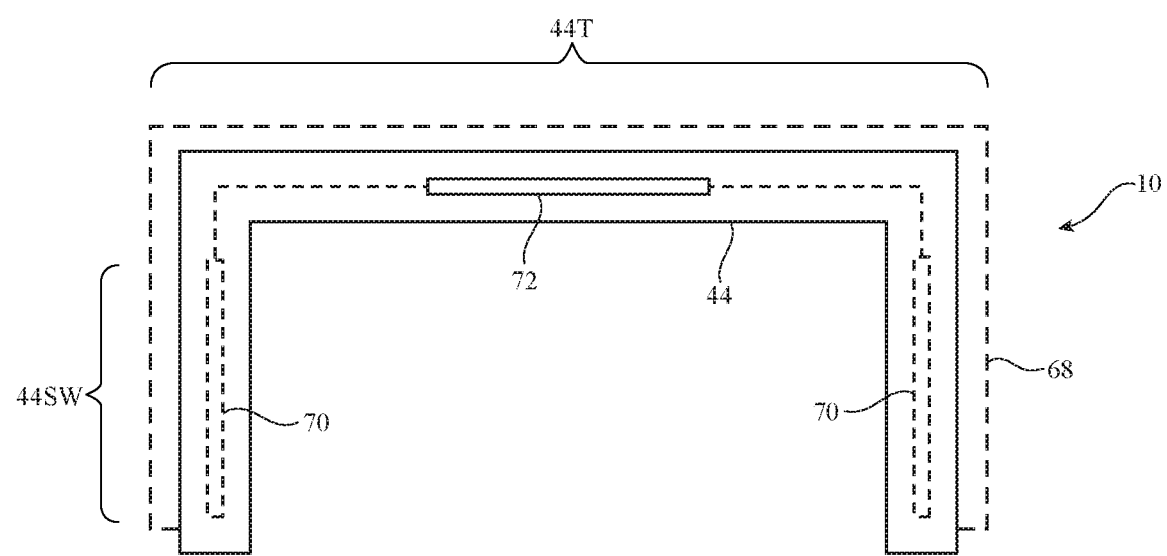
FIG. 6 is a front view of an illustrative finger device showing how touch sensors may be incorporated into the device in accordance with an embodiment.

FIG. 6 is a front view of device 10 showing how device 10 may have a touch sensor (illustrative touch sensor 68) that overlaps both sidewalls (sides) 44SW and top portion 44T of housing 44. Touch sensor 68 may have electrodes formed on a flexible printed circuit, on an inner surface of a housing sidewall in housing 44, on an exterior surface of housing 44, and/or other suitable portions of device 10. In one illustrative configuration, circuitry such as circuitry 72 in housing 44 (e.g., a printed circuit, integrated circuits, touch sensor control circuitry, etc.) may communicate with touch sensors 70 on sidewalls 44SW of housing 44 (e.g., using signal paths formed from a flexible printed circuit that extends between circuitry 72 and sensors 70, using a flexible printed circuit substrate that contains both signal paths for coupling to circuitry 72 and an array of capacitive touch sensor electrodes, etc.).

Flexible printed circuits containing capacitive touch sensor electrodes may be formed from a conductive material such as silver (e.g., silver paint/ink including silver filler in a polymer binder), silver nanowires, copper, or other metal traces on a polymer substrate material such as polyethylene terephthalate (PET) substrate or polyimide substrate. Configurations may also be used in which capacitor sensor substrates include fabric (e.g., fabric onto which conductive traces are deposited and/or fabric with conductive strands of material forming electrodes, etc.). Capacitive sensors may use mutual capacitance sensing arrangements or self-capacitance sensing arrangements. Touch sensors for device 10 may be formed on a single sidewall 44SW, one two sidewalls 44SW (e.g., housing portions on the left and right of finger 40), on one or both sidewalls 44SW and top portion 44T, on top portion 44T only, and/or on any other suitable areas of device 10.

If desired, non-capacitive touch sensing such as touch/proximity sensors based on optical sensing, ultrasonic sensing, force detection, etc. may be used in addition to and/or instead of using capacitive touch sensing. Touch sensors such as illustrative touch sensors 68 and/or 70 of FIG. 6 may be formed using single touch sensor elements (e.g., a single capacitive touch sensor electrode, a single ultrasonic sensor element, a single optical sensor element, etc.) and/or may be formed using one-dimensional (line-shaped) and/or two-dimensional arrays of sensor elements (e.g., sensors with rows and columns of capacitive sensing electrodes, light sensor devices, ultrasonic sensor devices, etc.).

Figure 7:
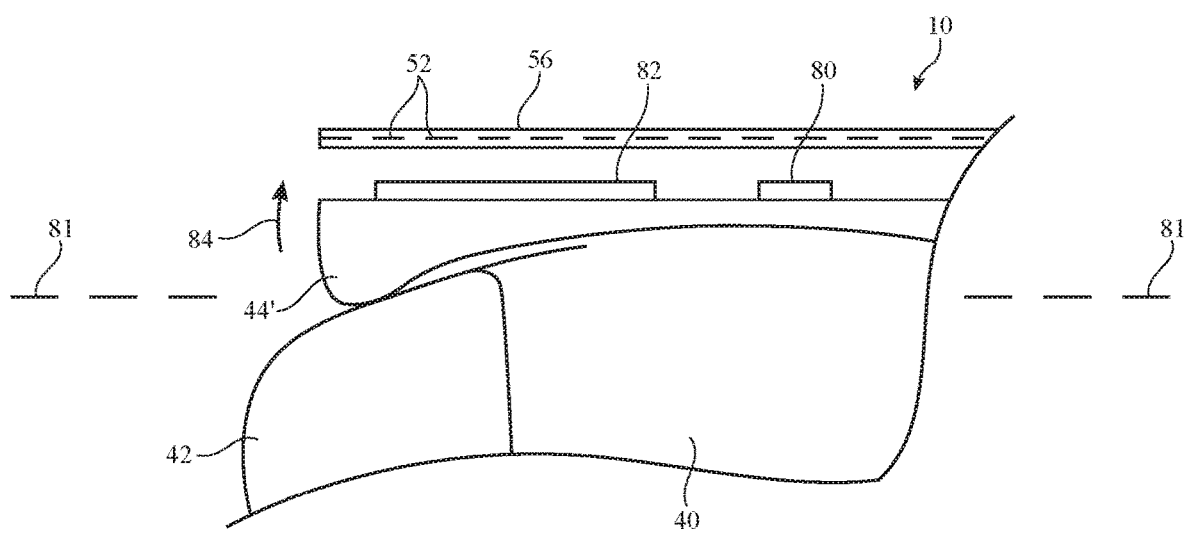
FIG. 7 is a cross-sectional top view of a portion of an illustrative finger device having a touch sensor array and strain gauge circuitry and having haptic output circuitry mounted on a bendable elongated arm portion of a housing for the finger device in accordance with an embodiment.

A cross-sectional top view of device 10 in an illustrative configuration in which device 10 includes force sensor circuitry such as strain gauge circuitry and haptic output components is shown in FIG. 7. As shown in FIG. 7, electrodes 52 may form touch sensor 56. For example, touch sensor 56 may be a two-dimensional touch sensor that extends over the sides and/or top of housing 44 (e.g., on the inner surface of housing 44 and/or other suitable portions of device 10). Housing 44 may have an elongated portion such as portion 44' of FIG. 7 (sometimes referred to as an arm) that extends along longitudinal housing axis 81 (e.g., an axis parallel to the length of finger 40). Arm 44' may be configured to bend in direction 84 under pressure from finger 40 (e.g., sideways finger motion and/or other finger input). Strain gauge circuitry 80 may be formed near the base of arm 44' (e.g., where arm 44' attaches to the remainder of housing 44) so that bending of arm 44' can be detected by strain gauge circuitry 80. Strain gauge circuitry 80 may contain one or more strain gauges. If desired, other force sensing components may be used to detect bending of arm 44' (e.g., a piezoelectric force sensor, etc.).

As shown in FIG. 7, additional components such as component 82 may be mounted on arm 44'. Component 82 may be, as an example, a haptic output device that generates haptic output for finger 40 or other suitable electrical component. In some arrangements, component 82 may be a piezoelectric device that serves both as a haptic output component and as a force sensor. Using circuitry of the type shown in FIG. 7, device 10 can monitor finger forces imposed on the sidewalls of device 10, thereby measuring shear and/or normal forces as a user manipulates device 10 and interacts with the surrounding environment. Touch input can be gathered from touch sensor 56 and/or can be extrapolated from force sensor measurements made with strain gauge circuitry 80.

Figure 8:
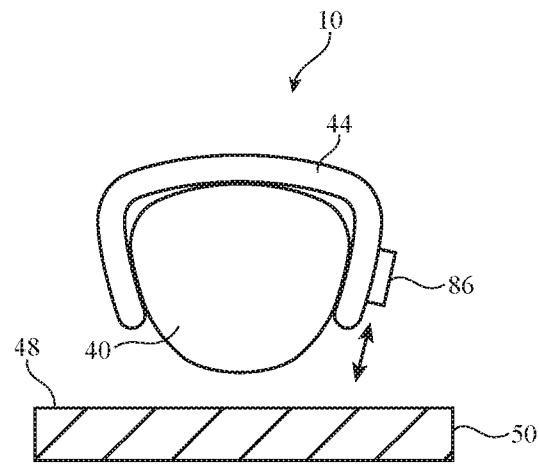
FIG. 8 is a front view of an illustrative finger device with proximity sensing circuitry in accordance with an embodiment.

FIG. 8 shows how housing 44 may be provided with one or more sensors 86 that are used to sense the separation between device 10 (e.g., housing 44 and finger 40) and surface 48 of structure 50. Sensors 86 may be optical sensors, capacitive sensors, ultrasonic sensors, and/or other sensors (e.g., proximity sensors, distance sensors, etc.). Using sensors such as sensor 86 of FIG. 8, device 10 can monitor the distance between device 10 and surface 48, and/or can gather information on device orientation, and/or device motion.

Figure 9:
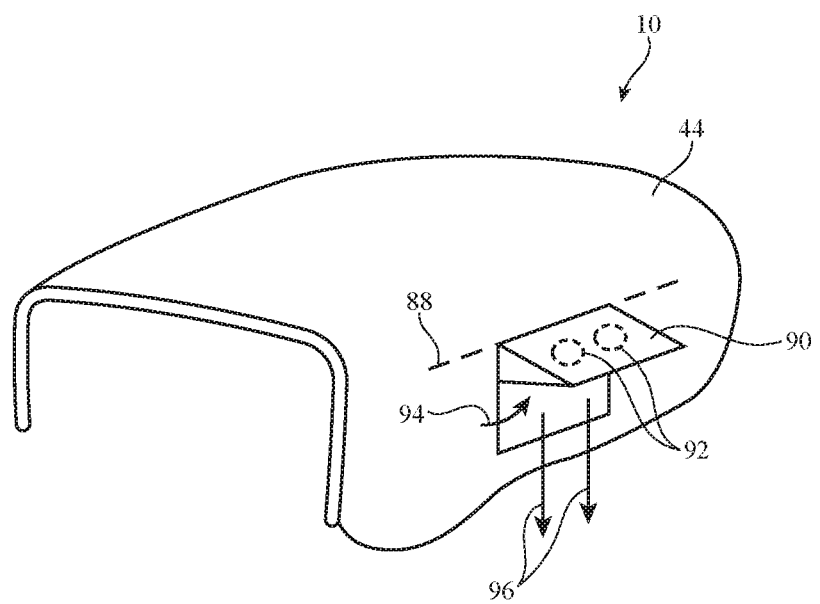
FIG. 9 is a perspective view of an illustrative finger device with a sensor such as a depth sensor based on multiple cameras with respective digital image sensors in accordance with an embodiment.

FIG. 9 shows how housing 44 may be provided with a depth sensor or other sensor having multiple sensor components 92. Sensor components 92 may be, for example, a pair of digital image sensors configured to form a stereoscopic depth sensor. With one illustrative configuration, portion 90 of housing 44 may be coupled to a hinge that is aligned with hinge axis 88. Portion 90 may be rotated (pivoted) about hinge axis 88 in direction 94 when it is desired to use components 92 (e.g., to capture images of objects in directions 96). Using the depth sensor of FIG. 9, device 10 can gather information on the orientation, position, and/or motion of device 10 relative to other structures and/or can collect information about the surroundings of device 10 (e.g., images of real-world objects, three-dimensional maps of real-world objects, etc.).

Figure 10:
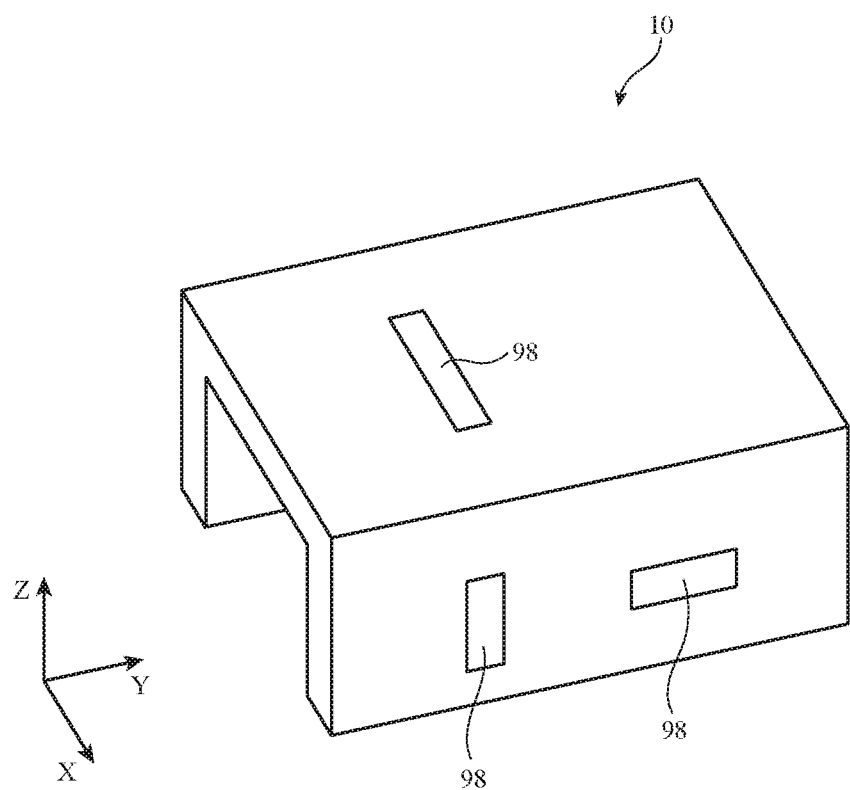
FIG. 10 is a perspective view of an illustrative finger device with sensors oriented along three orthogonal axes to monitor finger activity in accordance with an embodiment.

FIG. 10 is a perspective view of device 10 in an illustrative configuration in which device 10 has a set of sensors 98 oriented to gather data in orthogonal directions. There may be, for example, three sensors 98, each of which has its direction of operation (e.g., its most sensitive operating direction) oriented respectively along the X, Y, or Z axis of FIG. 10. As device 10 is moved while being worn by a user on finger 40, sensors 98 may be used to gather information on the movement, orientation, and position of device 10. Sensors 98 may be, for example, radio-frequency sensors such as radio-frequency transceivers (e.g., transmitters and receivers) coupled to directional antennas. During operation, each sensor 98 may emit radio-frequency signals and may detect corresponding reflected signals from external objects. In another illustrative arrangement, base stations and/or other external electronic equipment (e.g., devices 24, etc.) can emit reference (beacon) radio-frequency signals that are measured using the receivers in sensors 98. If desired, other types of directional sensors may be include in device 10 (e.g., optical sensors such as lidar sensors, directional ultrasonic sensors, etc.). The use of three orthogonally oriented radio-frequency sensors is illustrative.

Figure 11:
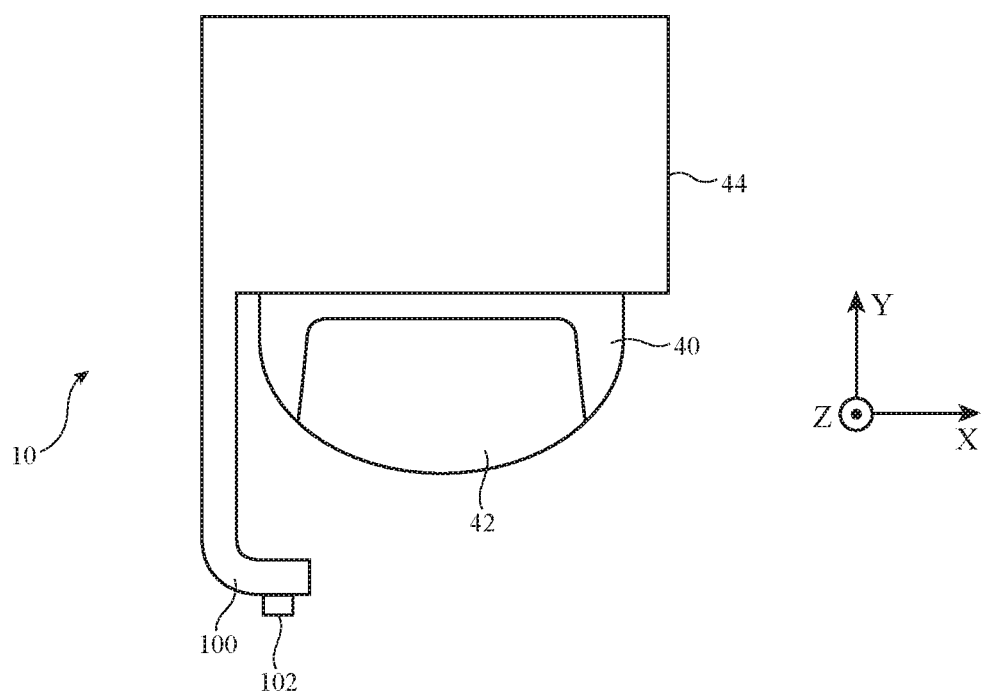
FIG. 11 is a top view of an illustrative finger device with a sensor mounted on a housing portion that protrudes beyond the tip of a user's finger in accordance with an embodiment.

FIG. 11 is a top view of device 10 in an illustrative configuration in which housing 44 has a forwardly protruding portion such as portion 100 that extends past the tip of finger 40 when device 10 is being worn by a user. Portion 100 may serve as a support for electrical components such as component 102. Component 102 may be, for example, a proximity sensor and/or distance sensor such as an optical sensor, a capacitive sensor, an ultrasonic sensor, and/or other sensor configured to gather information on the distance between device 10 and surrounding surfaces. This allows device 10 to gather information on the position, orientation, and/or movement of device 10 and/or information about nearby objects.

Figure 12:
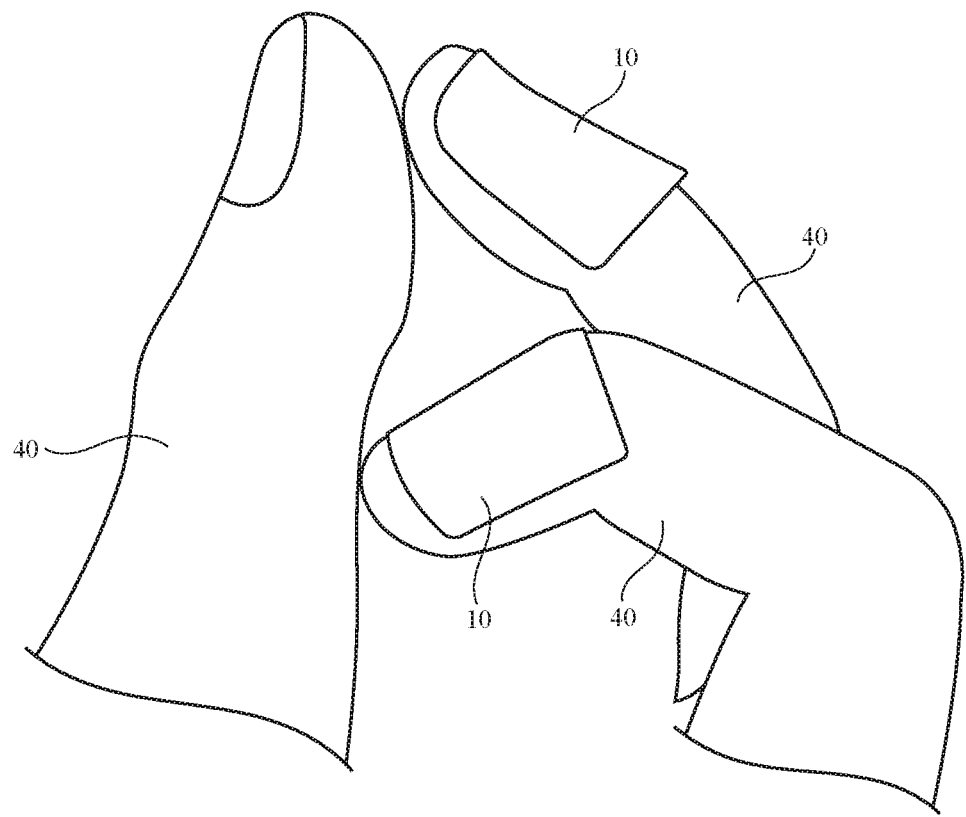
FIG. 12 is a diagram showing how a user may use multiple finger devices and may use these devices to interact with body parts or other objects in accordance with an embodiment.

As shown in FIG. 12, a user may have more than a single device 10. In the FIG. 12 example, the user is wearing a first finger device 10 on a first finger 40 and a second finger device 10 on a second finger 40. Each of these finger devices 10 may gather user input (e.g., input measured through force sensors, ultrasonic sensors, optical sensors, capacitive sensors, etc.) as the first and second fingers 40 interact with a third finger 40 (e.g., the underside surface of the user's thumb in this example). The input that is gathered in this way may include information on interactions between finger devices 10 and surfaces associated with other fingers 40 and/or other surfaces (e.g., surfaces associated with a user's legs, the back of a user's hand, the palm of a user's hand, or other body parts, surfaces associated with inanimate external objects such as pencils, bottles, tabletops, etc., surfaces associated with electronic devices such as display surfaces, keyboard surfaces, housing and button surfaces in accessories, etc.). The input may include touch input (e.g., input indicative of contact between finger 40 and an external surface), shear force input (e.g., information indicating that a user is pushing and/or dragging finger 40 to one side while contacting an external surface with finger pad 40P), and/or normal force input (e.g., information on how forcefully finger 40 is pressing against an external surface).

In some arrangements, information on the relative motions between devices 10 may be gathered. For example, sensors in devices 10 may be used to gather information indicating that devices 10 are moving towards or away from each other and/or information on device position, orientation, etc. This allows users with multiple devices 10 to make multi-finger gestures (e.g., pinch-to-zoom gestures, gestures in which an item is selected by grasping the item with opposing fingers, etc.).

In configurations of the type shown in FIG. 12 in which the user's fingers 40 with devices 10 are contacting and interacting with another finger 40 or other surface of the user's body, the user need not be in the vicinity of an external inanimate object such as a tabletop in order to provide input. Rather, the user may supply touch gestures and other gestures by creating finger interactions between the fingers 40 that are wearing devices 10 and/or fingers not wearing devices 10 and/or other objects. If desired, finger motions through the air and/or other finger activity associated with changes in finger location, orientation, motion, and/or finger forces may be gathered as finger input using devices 10. Touch sensor input may also be gathered using touch sensor circuitry in devices 10. The finger input may include finger taps, finger swipes (e.g., velocity-dependent and/or direction-dependent swipe gestures), finger pinch-to-zoom gestures, gestures in which fingers squeeze together, gestures in which fingers press with different forces against a surface, three-dimensional free space gestures such as finger flicks and/or up-and-down finger motions (e.g., a up motion followed by a down motion on a particular tap location within a predetermined time to select an item associated with the tap location), gestures such as thumb rolls, fine-tuning gestures, inertial swipes, tap-and-swipe gestures, dwell-time-dependent force input, and/or other finger activities in which finger(s) 40 move through the air, move along a surface, and/or press against a surface in a predetermined pattern.

System 8 may include an optical sensor such as a gaze detection sensor (sometimes referred to as a gaze detector, gaze tracker, gaze tracking system, or eye monitoring system). A gaze tracking system for system 8 may, for example, include image sensors, light sources, and/or other equipment that is used in monitoring the eyes of a user. This system may include one or more visible and/or infrared cameras that face a viewer's eyes and capture images of the viewer's (user's) eyes. During operation of system 8, control circuitry in system 8 (e.g., control circuitry coupled to a housing in device 24) may use the gaze tracking system to track a viewer's gaze. Cameras and/or other sensors in device 24 may, for example, determine the location of a user's eyes (e.g., the centers of the user's pupils) and may determine the direction in which the user's eyes are oriented.

The orientation of the user's gaze may be used to determine a location in a virtual and/or real-world environment in which a user's eyes are directed (sometimes referred to as the user's point-of-gaze). If desired, device 24 and/or other equipment in system 8 may use gaze tracking information such as information on the user's point-of-gaze in determining which actions to take in system 8. For example, a gaze tracking system may determine that a user's point-of-gaze is directed towards a first object and not a second object and may respond by assuming that the user is visually selecting the first object and not the second object. Finger input and/or other user input may be used in combination with input such as point-of-gaze information in determining which actions are to be taken in system 8.

Figure 13:
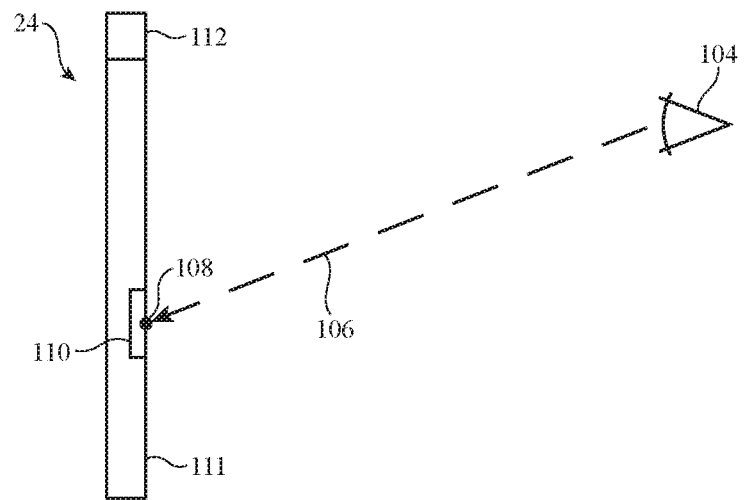
FIG. 13 is a side view of an illustrative system having a computer with a computer housing in which a display is mounted or other equipment with a display and having a gaze tracker in accordance with an embodiment.

Consider, as an example, a scenario of the type shown in FIG. 13. In this example, device 24 has a housing in which gaze tracker 112 has been mounted for monitoring a user's eyes 104. Device 24 may include components such as component 111. Component 111 may be, for example, a display that is configured to display images for the user. The image may include one or more objects (e.g., visual items) such as object 110. Control circuitry in device 24 may use gaze tracker 112 to determine the direction 106 in which the user is viewing component 111 or other object. Using direction 106 and/or other information from gaze tracker 112 and/or other sensors (e.g., a depth sensor and/or other sensors that determine the distance of the user from device 24), device 24 may determine the location of the user's point-of-gaze 108 on component 111. For example, device 24 can determine whether a virtual object such as object 110 on the display of FIG. 13 is currently being viewed by the user.

Figure 14:
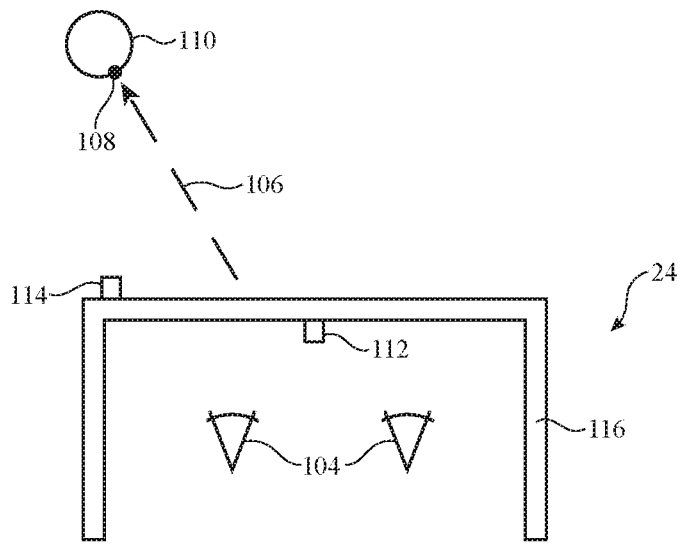
FIG. 14 is a top view of an illustrative head-mounted device having support structures configured to support a display and sensors such as a forward facing camera and gaze tracker in accordance with an embodiment.

Another illustrative system with gaze tracking is shown in FIG. 14. In the example of FIG. 14, device 24 is a head-mounted device having a head-mounted support structure 116 (sometimes referred to as a housing) that is configured to be worn on the head of a user. Rear facing gaze tracking system 112 may monitor user's eyes 104 to determine the direction 106 of the user's gaze. Additional sensors (e.g. depth sensor 114) may be used in determining the location and/or other attributes of objects in the user's field of view such as object 110 of FIG. 14. Object 110 may be a real-world object (e.g., a body part of the user or other person, an inanimate object with circuitry such as one or more devices 24, a non-electronic inanimate object such as a pencil, ball, bottle, cup, table, wall, etc.) or may be a computer-generated (virtual) object that is being presented to the user's eyes 104 by a display in device 24 (e.g., a see-through display system or a display system in which virtual content is overlaid on real-world images on the display that have been captured with camera 114). Using information on the direction 106 of the user's gaze and information on the relative position between the user and object 110 (e.g., information from a depth sensor in device 24 and/or information on virtual objects being presented to the user), device 24 may determine when the user's point-of-gaze 108 coincides with object 110.

Arrangements of the type shown in FIGS. 13 and 14 allow a user to interact with real-world content and computer-generated (virtual) content. For example, a user may select an object of interest by directing point-of-gaze 108 towards that object (e.g., for more than a predetermined dwell time and/or until associated user input such as finger input is received to confirm selection). Using finger device(s) 10 and/or other equipment in system 8, the user may perform operations on the selected object. For example, an object that is selected by a lingering point-of-gaze or other selection action may be manipulated using two-dimensional touch input gathered using touch sensor 68, using force input, or other input gathered using other sensors 18. Examples of virtual object manipulations that may be performed based on two-dimensional touch input and/or other sensor input include object translations, rotations, resizing operations, alterations of other visual properties such as colors, textures, brightness levels, and/or contrast settings, etc.

Real-world objects can also be manipulated. These objects may include, for example, real-world devices such as electronic systems in a home or office, electronic devices such as portable electronic devices, and/or other electronic equipment, computers, home automation systems, lighting, heating and ventilation systems, window blinds, door locks, security cameras, thermostats, audio systems, audio-visual equipment such as televisions, set-top boxes, voice assistant speakers, and/or other electronic equipment (e.g., devices including components such as the circuitry of devices 24). Examples of real-life object manipulations that may be performed on a selected object include adjusting the brightness of a lightbulb (part of a wireless lighting system), adjusting the temperature of a thermostat, adjusting the operation of a computer, adjusting a television (e.g., changing channels, adjusting volume, changing video and/or audio sources, selecting tracks and video clips to play, etc.), adjusting speaker volume, skipping tracks, etc.

If desired, objects may be selected by detecting when finger 40 and device 10 are pointing at an object of interest (e.g., by tracking the location of objects and/or device 10 using a camera in device 24 or device 10 and by determining the orientation and pointing direction of device 10 and finger 40 using an inertial measurement unit or other orientation sensor in device 10 and/or by using radio-frequency sensors and/or using the camera to track the location and orientation of device 10 using optical tracking elements on device 10). Relative position determination and object selection may be performed using radio-frequency sensors (e.g., IEEE ultra-wideband sensors) for detecting the orientation and location of device 10 and determining the range of an object, etc. and/or using other sensors 18. Commands for adjusting real-world equipment after selecting a real-world item of equipment using device 10 may include touch gestures finger pinch input, or other sensor input to increase or decrease a desired setting and/or other user input.

Consider, as a first example, a scenario in which object 110 is a computer-generated icon. In this situation, after aligning point-of-gaze 108 to overlap the computer-generated icon and thereby select the icon for further action, a user may supply a command with finger devices 10 and/or other input components in system 8 that direct system 8 to commence an associated operation in system 8. If, as an example, the icon is an email icon, system 8 may, upon receipt of finger input from the user, launch an email program on device 24.

In a second example, object 110 is a real-world object such as a non-electronic inanimate object (e.g., an object being viewed by the user of device 24 of FIG. 14 while device 24 is being worn on the head of the user). In response to detecting that the user's point-of-gaze 108 is directed at object 110 and in response to receipt of user finger input or other suitable input from the user, device 24 may generate a virtual object that overlaps all or part of object 110 in the user's field of view. Other operations may include, magnifying part of object 110, changing the color or texture of object 110, adding an outline around object 110, adding graphical elements that are aligned with object 110, and/or taking other suitable actions.

In a third example, object 110 is a real-world object that includes circuitry. Object 110 may be, for example, a wireless speaker or other electronic device 24. In response to detecting that the user's point-of-gaze 108 is directed at object 110 and in response to receipt of user finger input or other suitable input from the user, device 24 may adjust the output volume of the speaker. If the object that coincides with point-of-gaze 108 is a device such as a television, the channel of the television may be changed in response to the user finger input or other input. In this way, a user can interact with electronic devices around the user's home or office or electronic devices in other environments simply by gazing at the objects and supplying additional user input in coordination with this point-of-gaze selection. The additional user input may be made using finger device(s) 10 and/or other input devices (e.g., a mouse or other pointing device, a device that processes voice commands, a keyboard, a touch screen display in a cellular telephone or tablet device, etc.). Point-of-gaze dwell time, eye blinks, and other eye activity may also be used as a user input.

A user may touch items in the user's surroundings while wearing finger devices 10. Measurements made with sensors in devices 10 as the user touches the surfaces of these items can be used in determining the contours of the items. This information can then be combined with optional additional sensor data such as depth sensor data, camera images, etc. to determine the attributes of the items such as item size, item shape, item location, etc. Examples of sensors that may be used in devices 10 to measure the contours of items include inertial measurement units, which can track the orientation, position, and/or movement of devices 10 in three dimensions and force and/or touch sensors in devices 10 that can sense when a user has contacted the surface of an item. Depth sensors in devices 10 and/or 24 may also be used in gathering three-dimensional surface maps (surface contour information) for objects in the user's surroundings.

Figure 15:
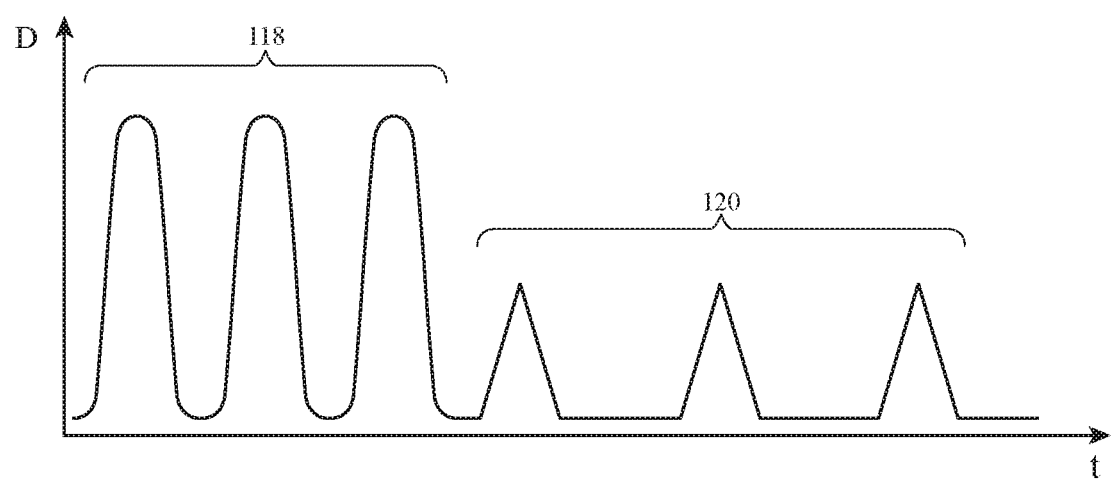
FIG. 15 is a graph showing illustrative haptic output signals that may be produced to provide a user with different textures when interacting with virtual objects and/or real-world objects in accordance with an embodiment.

Once system 8 has gathered information on the contour of an object in the user's surroundings, virtual content may be created that partially or completely overlaps the surface of the object and/or haptic output associated with the surface of the object may be generated. As an example, knowing the locations of the surfaces of a cube, system 8 can overlay virtual content on one or more cube surfaces and can use haptic output devices in finger devices 10 to apply haptic output to the user's fingers 40 whenever system 8 determines that the user's fingers are touching these surfaces. If desired, different surfaces of the cube or other object can be provided with different virtual textures using the haptic output devices. As an example, control circuitry in device 10 can supply a first drive signal D with a relatively high amplitude and frequency whenever the user's fingers are touching a first side of the cube (see, e.g., drive signal D of time period 118 in the graph of FIG. 15 in which drive signal D has been plotted as a function of time t). Whenever the user's fingers are determined to be touching a second side of the cube, a different texture can be supplied to the user's fingers with the haptic output components in finger devices 10. As an example, if the user touches the second side of the cube during time period 120 of FIG. 15, a lower-frequency and lower-magnitude drive signal D can be used to control the haptic output components in finger devices 10. As a result, the user will feel a first texture when touching the first side of the cube and a second texture when touching a second side of the cube. If desired, cubes and other objects can be provided with haptic effects along the edges of the objects such as haptic output can create shape and/or rounded edges, can create effects associated with compliant structures, and/or can generate detents, force-feedback simulating motion resistance, clicks simulating depression and/or release of a button with a physical click sensation, and/or other haptic effects. Corresponding visual effects can be provided.

Figure 16:
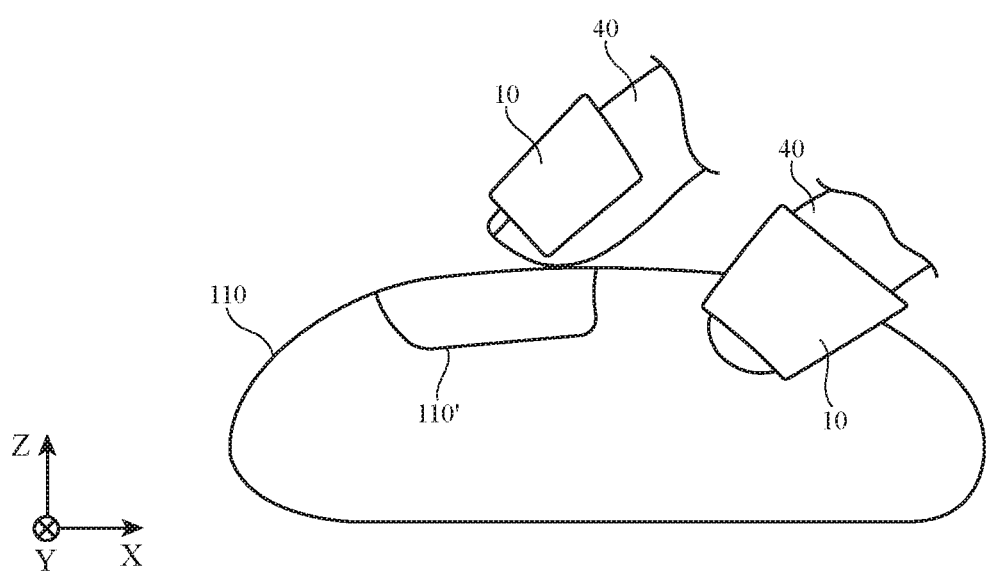
FIG. 16 is a side view of an illustrative object such as an electronic device or non-electronic inanimate object showing how a user with one or more finger devices may interact with the object in accordance with an embodiment.

FIG. 16 is a diagram showing how a user with one or more finger devices 10 may press fingers 40 against the exposed surfaces of an object 110 to measure the contours of object 110 in three dimensions. This allows system 8 to determine the shape of all sides of object 110, including the far side of object 110 that might not be visible by a camera or other sensor in device 24 (e.g., in a scenario in which device 24 is a head-mounted device with a front-facing camera capturing real-world images).

Object 110 may be an inanimate object without circuitry (e.g., an object other than an electronic device such as a pencil, etc.) or may be an electronic device. In the example of FIG. 16, object 110 is an electronic device with an input component such as component 110' that may gather user input. Object 110 may be, for example, a touch screen display and component 110' may be a touch sensor in the display. In another illustrative configuration, object 110 may be a computer mouse that gathers pointing input from a user and component 110' may be a depressible button (switch) on the computer mouse. In yet additional scenarios, object 110 may be a cellular telephone, tablet computer, desktop computer, or keyboard, and component 110' may be a touch screen, touch sensitive button, keyboard key, or other input device on object 110.

During operation, system 8 may optionally use device 24 (e.g., a head-mounted display device) to display images that are overlaid on top of some or all of object 110. Overlaid virtual content may, if desired, be used to transform a real-world object such as a stone or an ordinary household object into a control knob (e.g., a rotatable knob with haptic detents and/or other haptic features such as haptic-output button regions and with an appearance governed by the color, texture, and shape of the computer-generated image that is overlaid over the stone). In this way, electronic devices that are powered off, objects without circuitry, and/or other diverse objects in the user's surroundings can be used as input devices for controlling the operation of system 8. As an example, virtual controllers can be constructed from pencils, erasers, baskets, cups, plates, furniture, shoes or other items of clothing, boxes or other enclosures, paper notebooks, and/or other items that can be touched, rotated, moved, and/or otherwise manipulated by a user.

In some arrangements, finger input from devices 10 may be gathered from a user and/or haptic output can be provided by devices 10 when the user is wearing finger devices 10 during interactions with an object that is overlapped by virtual content. If desired, user input can be gathered using a gaze tracking system, depth sensors, cameras, and/or other sensors. Virtual content may, if desired, be overlaid over some portions of an object while leaving other portions uncovered. For example, a page in a notebook may contain handwritten notes. Virtual content such as computer-generated text annotations can be overlaid on a portion of the page adjacent to the notes. Pages in the notebook may have bar codes (e.g., QR codes) and/or other identifying information to help identify which pages are associated with corresponding annotation information (as an example).

Figure 17:
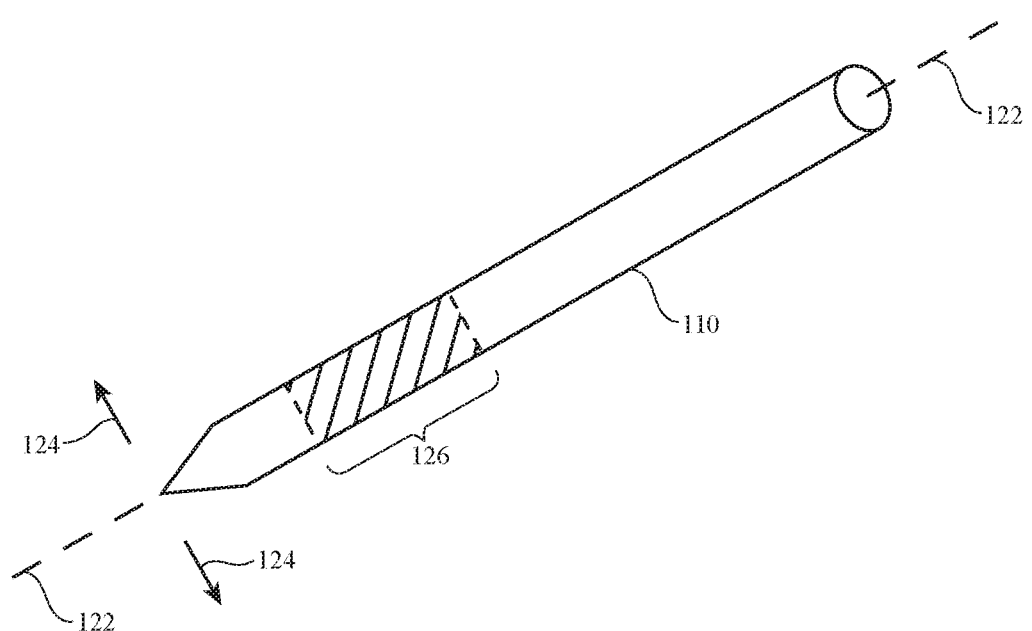
FIG. 17 is a perspective view of an illustrative inanimate object such as a pencil with which a user may interact while wearing one or more finger devices in accordance with an embodiment.

In the illustrative configuration of FIG. 17, object 110 is a pencil and does not contain any circuitry. A user wearing one or more finger devices 10 may rotate object 110 about longitudinal axis 112 of object 110. The user may also move object 110 (e.g., the tip and/or end of object 110) laterally, as indicated by lateral motions 124 of FIG. 17. During movement of object 110, finger devices 10 can gather information on the interactions between finger devices 10 and object 110 and can thereby be used in determining the location, orientation, and movement of object 110.

Different interactions with object 110 may be used to control different corresponding functions in system 8. For example, rotation of object 110 about axis 122 may adjust a volume or other analog property in system 8, may rotate a virtual object, and/or may create other changes in the operation of system 8. Lateral movement of object 110, changes in the angular orientation of object 110 (e.g., tilting of object 110), and/or other manipulations of object 110 can be used to produce other adjustments to the operation of system 8 (e.g., virtual object movement, adjusting of virtual object properties, adjusting hardware and/or software properties in system 8, etc.). Object 110 may be used as a wand, sword, joystick, and/or item in a virtual world.

In some arrangements, some or all of object 110 may be overlaid with virtual content. As an example, icons, movable controls, and/or other interactive visual elements may be displayed over all of object 110 or in a select area of object such as illustrative area 126. Area 126 may, as an example, include an array of virtual buttons that can be selected when a user presses finger 40 against a desired virtual button while wearing finger device 10. A user may also provide input to area 126 or other parts of object 110 such a force input (e.g., different amounts of pressure on the sides of object 110 in area 126 as the user squeezes object 110 in the user's fingers), sliding input (e.g., a swipe gesture), etc. In some arrangements, the location of the tip of object 110 can be tracked by analyzing the positions of fingers 40 and/or by tracking images of object 110 gathered with an image sensor in device 24. To help calibrate visual measurements of the shape and positions of the surfaces of object 110, a user may touch the entire surface of object 110 while corresponding measurements are made with finger devices 10, thereby determining the surface contours of object 110, a user may cause object 110 to interact with other system components (e.g., by placing the tip of object 110 against a force sensor in device 24 while object 110 is being imaged with a camera, etc.).

If desired, a user can interact with a virtual object that has been scanned using a depth sensor, finger device, or other sensing arrangement (e.g. to change the color, size, shape, appearance, etc. of the object). In some arrangements, device(s) 24 may use pattern recognition to recognize object 110 and may take actions accordingly (e.g., by creating a magic wand skin for a recognized pencil).

Figure 18:
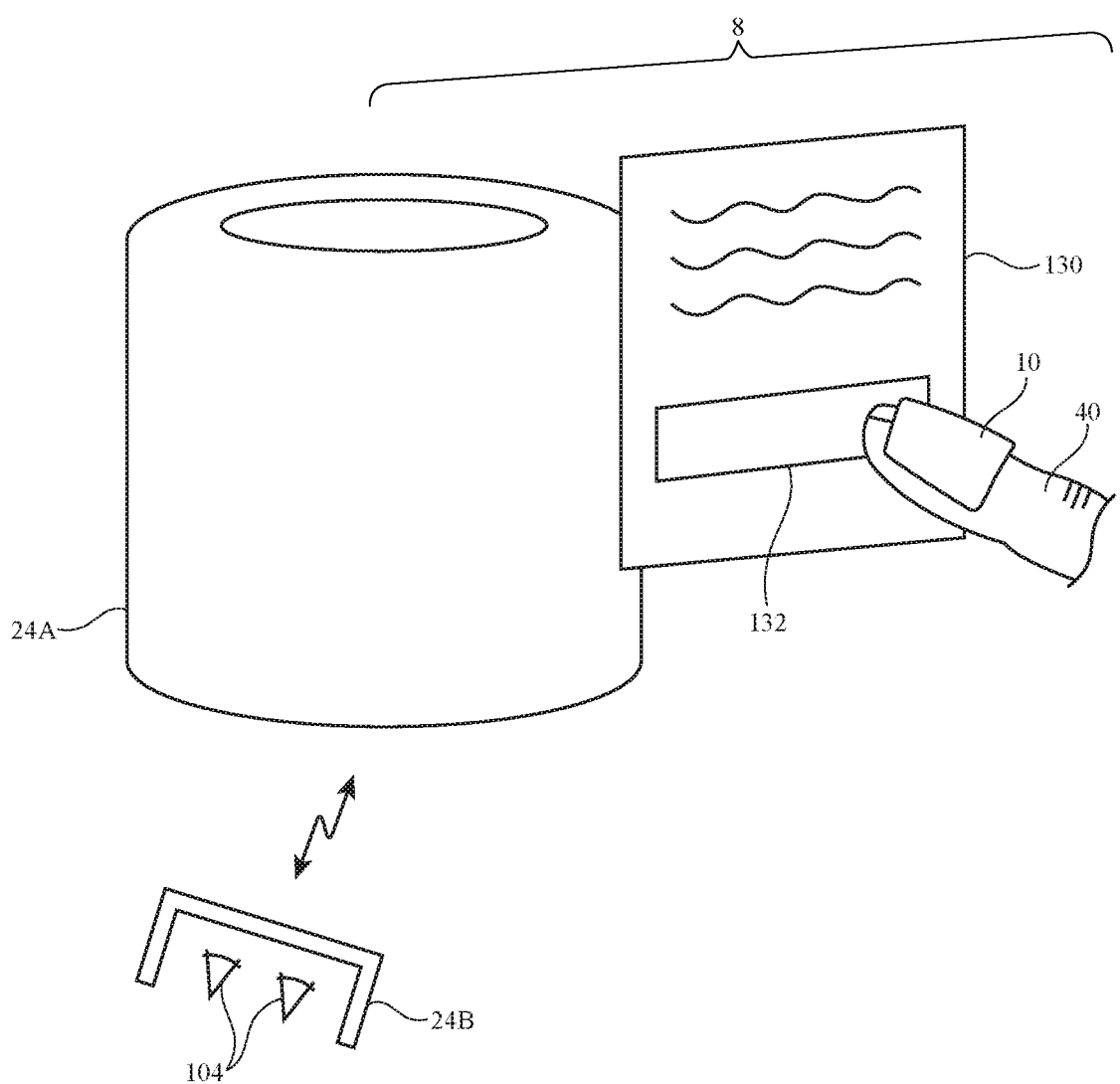
FIG. 18 is a perspective view of an illustrative electronic device and associated computer-generated visual content (virtual content) with which a user may interact using one or more finger devices in accordance with an embodiment.

In the configuration of FIG. 18, system 8 includes multiple electronic devices. Device 24A in the example of FIG. 18 is an electronic device such as an internet-connected voice-controlled speaker or other device that does not include a display capable of displaying extensive text. Device 24B is a head-mounted device having a head-mountable support structure (housing) being worn by a user so that the user's eyes 104 can view content generated by device 24B and the real-world environment surrounding device 24A.

A user may view supplemental computer-generated content on device 24B such as text-based content while interacting with device 24A. A user may, for example, be wearing one or more finger devices 10. The user may desire to view a list of available music tracks. In response to a finger command from finger devices 10 or other user input, device 24B may determine (directly or from wireless communications with device 24A) which tracks are available. The user may supply input commands with finger devices 10 or other input devices to navigate among virtual menu options and/or other options and thereby select a desired genre of music tracks to view. Computer-generated music track list 130 may then be displayed for the user by device 24B.

As an example, list 130 may be displayed adjacent to device 24A and/or overlapping some or all of device 24A. List 130 may contain selectable music tracks. A user may select a desired track by gesturing towards the track with finger device 10 (e.g., by placing the tip of the user's finger on a desired track for more than a predetermined amount of time, etc.), as illustrated by selected track 132 in FIG. 18. In response to selection of track 132, finger device 10 may provide haptic output (e.g., a click to confirm that track 132 has been selected), device 24B may take suitable action (e.g., by highlighting the track, by displaying information on the selected track, etc.), and device 24A may take suitable action (e.g., by playing the selected track in response to receiving the user finger input of the selection of track 132). Wireless communications and/or wired communications between devices 24A, 24B, and finger devices 10 may be used in coordinating operation of the system. In this type of environment, device 24A may, if desired, serve as a host device and device 24B may serve as an input-output accessor coupled to device 24A (e.g., in addition to input-output finger device 10 being worn on the user's finger) and/or other networked equipment arrangements may be used.

If desired, selections of music tracks and other items in a computer-generated list or other virtual content may be made based on eye tracking information in addition to and/or instead of using finger input. For example, list 130 may be displayed in response to eye tracking information. For example, if a user's point-of-gaze is directed towards device 24A for more than a predetermined amount of time and/or is directed towards device 24A while a user makes a particular finger gesture using device(s) 10, an interactive list such as list 130 can be automatically displayed to allow the user to make music track selections or other suitable selections.

In some configurations, inertial measurement unit input, touch input, and/or other input such as input from sensors 18 on the position and/or orientation of device 10 may be used (e.g., fused) by device 10 in controlling system 8. As an example, the orientation of finger device 10 relative to list of music tracks or other virtual list may be determined. If it is determined that device 10 is oriented orthogonal to the rows of items in the list, swiping of a finger along the length of a touch sensor on device 10 or other user input may cause the items in the list to scroll. If, on the other hand, it is determined that device 10 is oriented parallel to the rows in the list, a finger swipe or other input may cause the list to change from one playlist (or other list) to the next. In this way, finger device orientation can be used to help select that type of attribute of an item that is being controlled, whereas touch input or other input may be used to adjust the value of that attribute. Gaze tracking may also be used. For example, a user may select a virtual or real-life object using a directed point-of-gaze and may use force input, touch input, orientation input, and/or other input to manipulate the selected object. In general, lists may be scrolled, rotating carrousels or other lists of virtual items may be incremented sequentially (e.g., music tracks may be selected by rotating or otherwise horizontally incrementing a list of music tracks), and/or other operations may be used to manipulate visual content (e.g., content that is being presented to the user visually with device 24). With an illustrative configuration, a user may select a desired carrousel through point-of-gaze selection and may move through the list of items in the selected carrousel using touch input gestures or other user input. Once an item is selected from the list, the item can be manipulated. For example, in a computer-aided-design environment, user input from device 10 may be used to expand a design (e.g., to explode a previously unexploded design), may be used to remove and/or add elements to a design, etc.

Any of devices 24 may be controlled in this way. For example, device 24A of FIG. 18 may be a television, tablet computer, laptop computer, cellular telephone, and/or other adjustable equipment in a home or office (e.g., lights, thermostats, fans, audio equipment, shades, etc.). Gazed trackers in system 8 of FIG. 18 may be mounted on devices 24A and/or 24B. If desired, device 24A may include additional components (e.g., a display, etc.).

Figure 19:
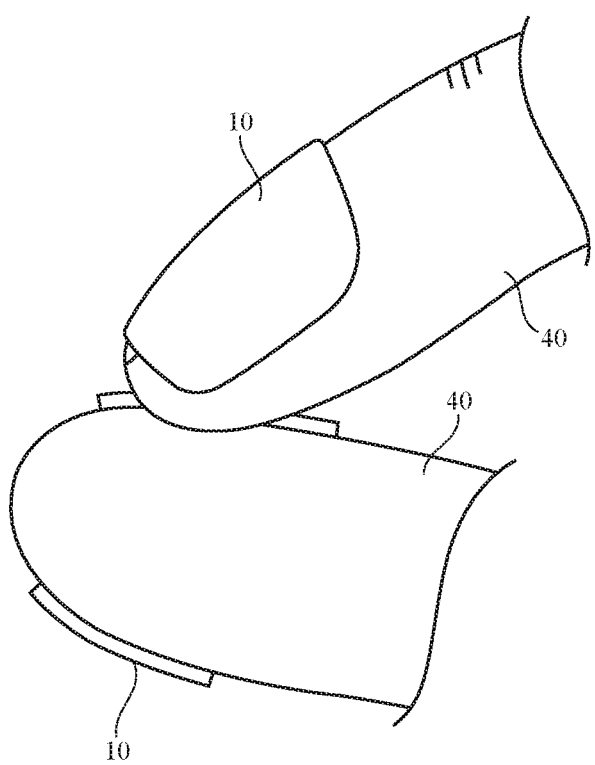
FIG. 19 is a perspective view of an illustrative pair of finger devices being used by a user with each other while being worn on two of a user's fingers in accordance with an embodiment.

As shown in FIG. 19, devices 10 may be used to interact with each other (e.g., to gather taps, swipes, pinch-to-zoom gesture input, etc.). If desired, devices 10 can measure the amount of finger pinching force generated as a user presses a pair of fingers 40 together. The amount of finger pinching force may be varied by a user dynamically to control the operation of system 8 in addition to other user finger input from devices 10. As an example, a user may adjust the linewidth of a line drawn in a virtual three-dimensional space by a drawing application running on system 8 (e.g., on device 24 such as a head-mounted display or other device 24 with a display).

Figure 20:
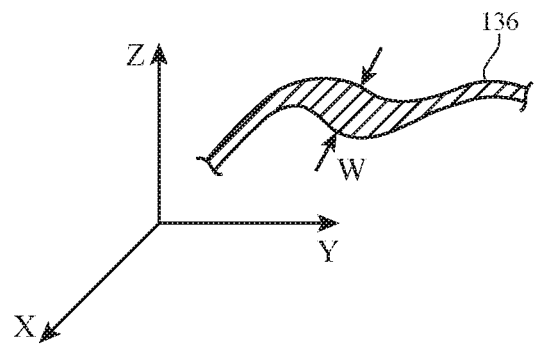
FIG. 20 is a perspective view of a three-dimensional workspace showing how a user with finger devices may create three-dimensional drawings or otherwise interact with three-dimensional computer-generated images in accordance with an embodiment.

A graph of an illustrative three-dimensional line is shown in FIG. 20. As shown in FIG. 20, line 136 may have a linewidth W that varies as a function of distance along line 136. The shape of line 136 may be determined by hand gestures (e.g., three-dimensional gestures through the air made by a user's hands). These motions, which may sometimes be referred to as three-dimensional finger gestures, may be gathered using inertial measurement units or other sensors in devices 10 and/or by tracking devices 10 using a camera in device 24 or other tracking equipment. At the same time that a user is drawing line 136 on the three-dimensional workspace of FIG. 20, the user may pinch fingers 40 together with a variable force. The amount of pinching force supplied by the user may be measured by finger devices 10 (e.g., using strain gauge circuitry) and may be used in adjusting the linewidth W dynamically. If, for example, the user desires to create a wide linewidth portion of line 136, the user may momentarily increase the pinch force applied to finger devices 10. In a pinch gesture, both devices 10 receive increased force measurements concurrently, so pinch gestures can be distinguished from gestures that involve forces applied to only a single finger device 10 such as a single-finger tap. In general, any suitable user input (touch, force, air gesture, etc.) may be used in controlling linewidth W or other adjustable object attribute. If desired, force input or other input (touch input, etc.) may be used to perform preview operations (e.g., to preview the content of an email message or other virtual item). Persistent application of the force input or other input may result in the email message (or other content) being opened for viewing (e.g., expanding the content of a message and sticking the opened message at a desired location within a user's field of view with device 24), whereas removal of the force input (or other input) may result in the previewed object reverting to its previous state.

In general, any suitable attributes of a drawn line or other on-screen content can be adjusted using finger pinch gestures and/or other finger input (e.g., brush texture and other brush attributes, line color, object size, etc.). The use of pinch gesture input to adjust linewidth W is illustrative. Finger pinch gestures and other finger input from devices 10 may also be used in controlling zooming functions (e.g., to zoom in on an item of interest by performing a three-dimensional pinch-to-zoom operation, etc.), rotation operations (e.g., to rotate a three-dimensional object), moving an object along a selected axis, and/or other operations in system 8.

Figure 21:
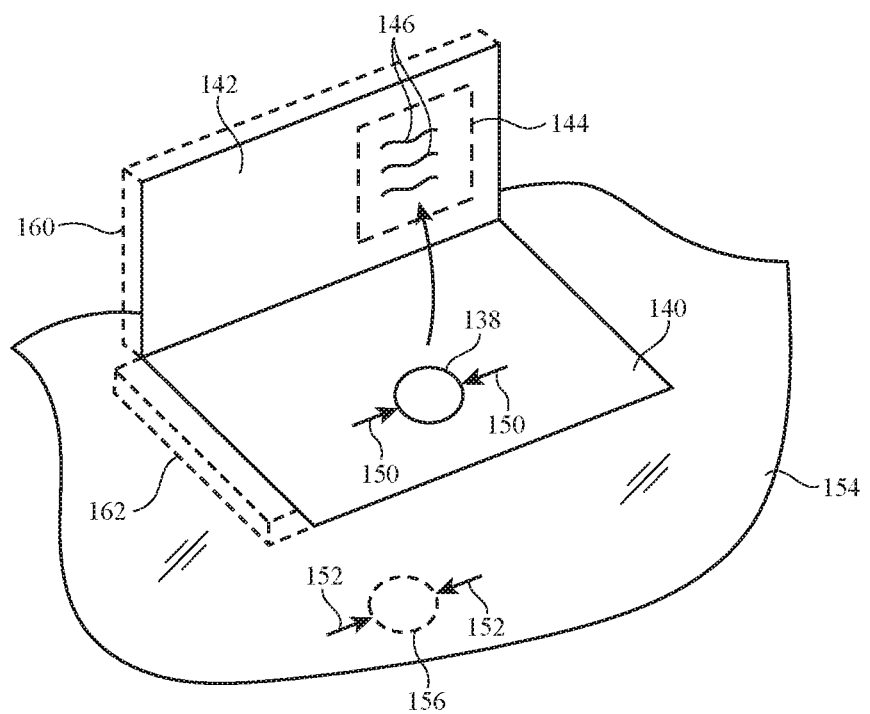
FIG. 21 is a perspective view of another illustrative three-dimensional workspace showing how a user may interact with virtual objects using finger devices in accordance with an embodiment.

FIG. 21 is a diagram of a mixed reality environment that may be presented to a user of device 24 while the user is interacting with device 24 using finger devices 10. The surface of real-world tabletop 154 may be overlaid with computer-generated objects such as virtual horizontal surface 140. Virtual vertical surface 142 may be displayed adjacent to virtual horizontal surface 140 (e.g., to form a virtual three-dimensional desktop). Surfaces 140 and 142 may, if desired, have colors, textures, and other visual attributes that help distinguish surfaces 140 and 142 from real-world objects. Icons, lists, menu options, text, still and/or moving images, and/or other virtual objects may be displayed on surfaces 140 and/or 142. These virtual objects may be manipulated by a user using finger devices 10.

In some configurations, surfaces 140 and 142 are not associated with any real-world objects (e.g., surfaces 140 and 142 may float). In other configurations, surface 140 and/or surface 142 may be aligned with the surface of a wall, table, or other non-electronic device and/or may be aligned with the surface of a display or other component in an electronic device. For example, surface 142 may be aligned with a table surface, so that movements of a user's finger and device 10 across the table may be used to drag-and-drop and otherwise move and manipulate virtual objects that are displayed visually on top of the table. At the same time, due to the physical presence of the table surface, the user's finger will contact the table (and finger device 10 will detect the contact and provide haptic feedback if desired) so that user selection of virtual objects on the table surface will feel natural to the user. If desired, trackpad or mouse input or other input to device 24 may be used in manipulating virtual objects on surfaces such as surface 142 (e.g., to move an object, etc.). To determine the locations of the surfaces of real-world objects, a user may touch real-world objects using device(s) 10. Force sensor signals and/or touch sensor signals or other feedback signals from other sensors 18 may be used indicate to system 8 when a user's fingers have contacted the surfaces of the real-world objects. From the known location of finger device 10 and the measured feedback, surface locations can be determined. In this way, the outlines (overall shapes) of real-world objects can be determined by system 8. Registration of the locations of real-world surfaces in this way can be complemented by image recognition operations performed using sensors in device 24 and/or device 10. For example, system 8 may use cameras, three-dimensional depth sensors, radio-frequency sensors operating using radar principles, and/or other sensors in system 8 to map out the locations and surface shapes of real-world structures. In general, feedback from sensors 18 in devices 10 may be used alone and/or in conjunction with information from other sensors in system 8 to help determine the shapes of real-world objects.

If desired, surface 142 may be aligned with a display in a desktop computer (see, e.g., illustrative optional structure 160 of FIG. 21, which may be a desktop computer with a housing and a display in the housing), surface 140 may be aligned with the display in a tablet computer lying on tabletop 154 (see, e.g., illustrative optional structure 162 of FIG. 21, which may be a tablet computer with a housing and a display in the housing), etc. These arrangements may be used to allow device 10 to gather input and provide haptic output while a user's finger is touching an object on the desktop computer display or on the display on the tablet computer. In the example of FIG. 21, surface 140 is aligned with surface 154. This is illustrative.

A user may interact with virtual content in the environment of FIG. 21 to control one or more associated devices 24 in system 8. Consider, as an example, a virtual object such as virtual object 138, which may be an email icon. A user who wishes to view an email inbox on a device 24 in system 8 may select object 138 by moving finger devices 10 inwardly in directions 150 towards object 138 with fingers 40. Haptic output devices in devices 10 can supply appropriate haptic feedback as the user's fingers reach the surfaces of object 138. After selecting the email icon, the user may move the email icon from surface 140 to surface 142 (e.g., using a drag and drop command, using a flick gesture, by picking up and throwing the icon, etc.). This directs the user's system (e.g., a computer and/or a head-mounted device 24 wirelessly communicating with the computer) to display email inbox 144 on surface 142. After email inbox 144 has been displayed, a user can place a finger 40 on a listed email message subject line 146 in the email list of inbox 144 to select and open a desired email.

If desired, a user need not interact with virtual object 138 directly. For example, virtual pointers (e.g., a pair of virtual fingers) may appear on surface 140 and may be manipulated remotely by the user as the user's finger devices 10 are, for example, moved in directions 152 to grasp about object manipulation location 156 on real-world tabletop 154. In this way, the virtual fingers may be directed to manipulate virtual object 138 (e.g., to move object 138 from surface 140 to surface 142 or to otherwise manipulate virtual objects in a virtual world being presented to the user).

When interacting with virtual objects such as virtual object 138 and list 144, the user's point-of-gaze can be used as user input in addition to and/or instead of using finger input from finger devices 10. As an example, the appearance of object 138 may be automatically enlarged or otherwise highlighted as a user's point-of-gaze is directed towards object 138. The user may then grasp the object using finger devices 10 or other finger input may be supplied so that the object can be moved to surface 142. In this way, virtual objects overlapping the real world (and/or real-time images of the real world) such as virtual object 138 may be manipulated using both point-of-gaze information and finger input from devices 10.

An image sensor or other circuitry in the equipment of FIG. 21 may serve as a hand tracking system. For example, structure 160 of FIG. 21 may be a desktop computer with an image sensor and/or structure 162 of FIG. 21 may be a tablet computer or other electronic device (see, e.g., devices 24) with an image sensor. The image sensor(s) can be used to capture images of a user's hand (e.g., a hand including finger 4). By processing this image data, system 8 can track the position of the user's hand (and finger 40). System 8 may, for example, be used to determine the distance of the user's hand from a display and to monitor horizontal and vertical movement of the hand relative to the display. By using a hand tracking system to determine the current position of the user's hand, the accuracy with which a computer or other equipment 24 can determine the position of finger device 10 and finger 40 can be enhanced.

For example, image-based hand tracking can be used alone or in combination with finger position data from device 10 to determine the location of device 10 and the user's finger relative to the device containing the image sensor and/or other circuitry of the hand tracking system (e.g., device 24). Device 10 can then be used to gather force measurements or other user input indicative of touch events in which the user's finger contacts the surface of the display in structure 160 and/or structures 162 (e.g., to select virtual objects of interest, etc.). Haptic output can be provided in response to detected touch contact between the exposed surface of the user's finger and a display surface. In this way, coarse movement such as movement of device 10 due to hand movement can be accurately tracked (e.g., using an image based hand-tracking system or other hand tracker alone or in combination with finger and hand movement data from device 10) while finger device 10 can use a force sensor or other sensor to sensitively detect of touch events (e.g., taps on the surface of the display and other fine movements such as movements associated with touching and thereby selecting a virtual object so that a hand movement or other movement of finger 40 can be used to move the selected virtual object across the display). While manipulating displayed objects using hand position measurements from an image sensor or other sensor in the hand tracking system and/or using finger device position data, finger device 10 can use a haptic output device to provide associated haptic output such as haptic output associated with a touch event.

As this example demonstrates, a user may manipulate virtual objects (e.g., the user may select and move objects, may draw lines, etc.) by moving finger device 10 (whether the position of finger device 10 is detected using a hand tracking system in device 24, position sensors in device 10, and/or both hand tracking and position sensor measurements). For example, a user may select, drag, and drop virtual objects on the display of device 24.

As the user interacts with system 8, the user input from the sensor can be wirelessly conveyed from device 10 to device 24 in real time and control signals for the haptic output device in device 10 can be received from control circuitry within device 10. The control signals for the haptic output device can originate within device 10 and/or can be provided to the haptic output device by the control circuitry within device 10 based on wirelessly received signals from device 24.

Figure 22:
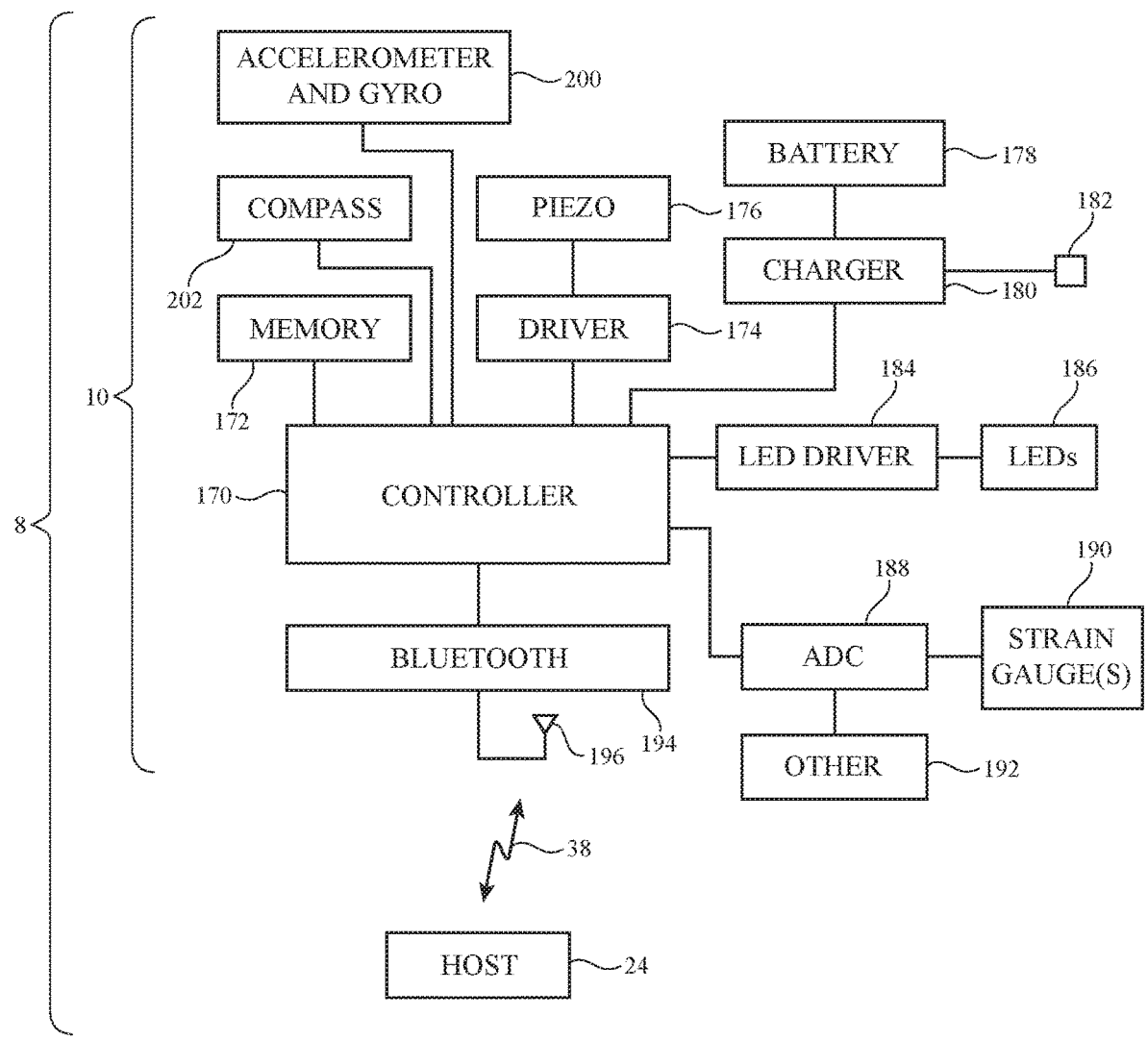
FIG. 22 is a schematic diagram of an illustrative system in accordance with an embodiment.

FIG. 22 is a schematic diagram of an illustrative configuration for system 8. In the example of FIG. 22, system 8 includes a first device such as finger device 10 that communicates wirelessly over path 38 with an external electronic device (host) 24. Device 10 may have storage and processing circuitry such as controller 170 and memory 172 and/or other control circuitry for controlling the operation of device 10. During operation, the control circuitry of device 10 (see, e.g., control circuitry 12 of FIG. 1) may use communications circuitry (see, e.g., communications circuitry 14 of FIG. 1) to communicate with electronic device 24. For example, controller 170 may use a wireless transceiver circuit such as Bluetooth® transceiver circuitry 194 and antenna 196 to communicate wirelessly with electronic device 24.

Power for device 10 may be supplied using an energy storage device such as battery 178 or a supercapacitor (as examples). Battery 178 may be charged using power supplied through connectors in port 182 and/or power received wirelessly from a wireless power transmitter using wireless power receiving circuitry in port 182. Charging circuitry 180 may supply received power to battery 178 to charge battery 178 and/or may direct received power to load circuitry in device 10.

To enhance the ability of cameras and other tracking equipment to track the position and orientation of device 10, controller 170 may use light-emitting diode drive circuitry 184 to turn on a set of light-emitting diodes 186 (e.g., a set of four light-emitting diodes, each located at a respective corner of the housing of device 10). Controller 170 can supply haptic output to the finger of a user by driving piezoelectric actuator 176 using piezoelectric driver circuitry 174 or may use other haptic output devices 20 to provide haptic output.

Device 10 may gather input from sensors (see, e.g., sensors 18 of FIG. 1) such as accelerometer and gyroscope 200 and compass 202. This input may provide controller 170 with information on the orientation and movement of device 10. Input from one or more strain gauges 190 and other sensor(s) 192 (e.g., force sensing resistors) may be gathered using analog-to-digital converter circuitry 188. Information from the strain gauges 190 and other sensors may be indicative of forces on housing 44 and may therefore be used in measuring lateral movement of finger 40 (e.g., movement that causes housing 44 to bend so that this bending may be detected using a strain gauge, movement that causes finger 40 to press against force sensing resistors, etc.). The use of multiple strain gauges 190 and/or other sets of multiple sensors may help make system 8 more robust to failure. Input from multiple strain gauges 190 may also be used by controller 170 to determine touch location and/or touch direction. If desired, touch input from a capacitive touch sensor or a touch sensor based on force sensors, may be gathered. User input (e.g., finger input that is gathered using motion and orientation sensors and/or other sensors such as strain gauge circuitry and/or other force sensors) can be processed locally and/or may be transmitted wirelessly to device 24 for processing.

Bluetooth circuitry 194 may be compliant with a standard such as the Universal Serial Bus (USB) Human Interface Device (HID) standard. During operation, controller 170 can process raw sensor data to detect taps and other gestures and to detect pointing movements of device 10. User input that has been detected can be transmitted wirelessly to electronic device 24. With another illustrative arrangement, controller 170 sends measured sensor data to electronic device 24 for processing (e.g., for tap identification and other gesture processing). Other arrangements may be used, if desired.

When taps and other user input events are detected by controller 170, controller 170 can supply haptic output to the user using driver 174 and actuator 176. This haptic output may, as an example, be appropriate in situations in which it is desired to provide a user who has made a tap input or other input with device 10 with corresponding haptic feedback. In scenarios in which taps and other user input devices are processed using processing circuitry at device 24, device 24 may wirelessly direct controller 170 to provide haptic output to the user's finger using driver 174 and piezoelectric actuator 176. Haptic output waveforms (see, e.g., FIG. 15) may be stored in memory 172.

If desired, input may be gathered from multiple users using finger devices 10 and/or other equipment in system 8. Output may also be provided to multiple users using finger devices 10 and/or other equipment in system 8. In some arrangements, user input from finger devices 10 and/or other equipment in system 8 can be gathered from multiple users that are interacting with each other in a virtual environment (e.g., a game, a social application, or other application in an online environment, a local environment in which users interact via local wireless communications such as communications arrangements in which equipment in system 8 is interconnected by a wireless local area network and/or peer-to-peer wireless connection, or other collaborative environment). During these interactions between users, haptic output and/or other output may be provided to the users using finger devices 10 and/or other equipment in system 8.

Control circuitry 12 in device(s) 10 and/or control circuitry 26 in device(s) 24 can take any suitable action in response to the input from multiple users. For example, if multiple users are playing a game and/or are interacting in a social application, control circuitry in system 8 may gather game and/or social application input from each of the users and, when appropriate, can provided haptic output or other output to one or more appropriate users (e.g., as a form of communication, as feedback related to in-game content, etc.). As another example, if two users are interacting socially (e.g., by shaking hands), control circuitry in system 8 may gather user input indicative of the shaking of hands from each of the users who is shaking hands and, in response, can take action such as providing haptic output to confirm to each of these users that business card information or other personal information has been exchanged wirelessly (e.g., a first type of haptic output indicating that contact information has been transmitted and/or a second type of haptic output indicating that contact information has been received). If desired, handshakes and other social interactions can take place online and haptic output or other output provided devices 10 and/or other equipment in system 8 accordingly (e.g., as feedback during an online handshake or other social interaction).

In some arrangements, devices 10 and/or other equipment in system 8 may be used by people with disabilities. Consider, as an example, a user with limited eyesight. This user may run an application on system 8 (e.g., on control circuitry 12 and/or 26). The application may use sensors 18 and/or 32 to sense when the user is in the vicinity of an object (e.g., a physical element in the user's surroundings such as a wall, door, or step). Time-of-flight optical sensors, radio-frequency sensors, and/or other sensors for range detection (e.g., long-range proximity sensors) can be used to detect external objects as the user is interacting with the user's environment. In response to detecting external objects, corresponding haptic output, audio output, and/or other output can be provided to the user with finger device 10 and/or other equipment in system 8. As an example, system 8 may be used to implement a virtual cane for the unsigned person of arbitrary length. As system 8 detects a step or other obstruction, haptic feedback or other output may inform the user of the presence of the step, so that the user can take appropriate action.

If desired, people with limited eyesight or other users may be provided with haptic output, audio output, and/or visual output using a head-mounted device (e.g., equipment 24 may include a head-mounted device) with or without accompanying output from finger device 10 in system 8. As an obstruction or person outside of the user's field of view is detected, for example, system 8 may provide haptic vibrations to alert the user or can provide other output that indicates to the wearer of the head-mounted device and/or finger device that the obstruction or person is present. Users that have hearing impairment may also be provided with haptic output and/or other output in this way to indicate the presence of external objects, people in the presence of the user, etc.

Figure 23:
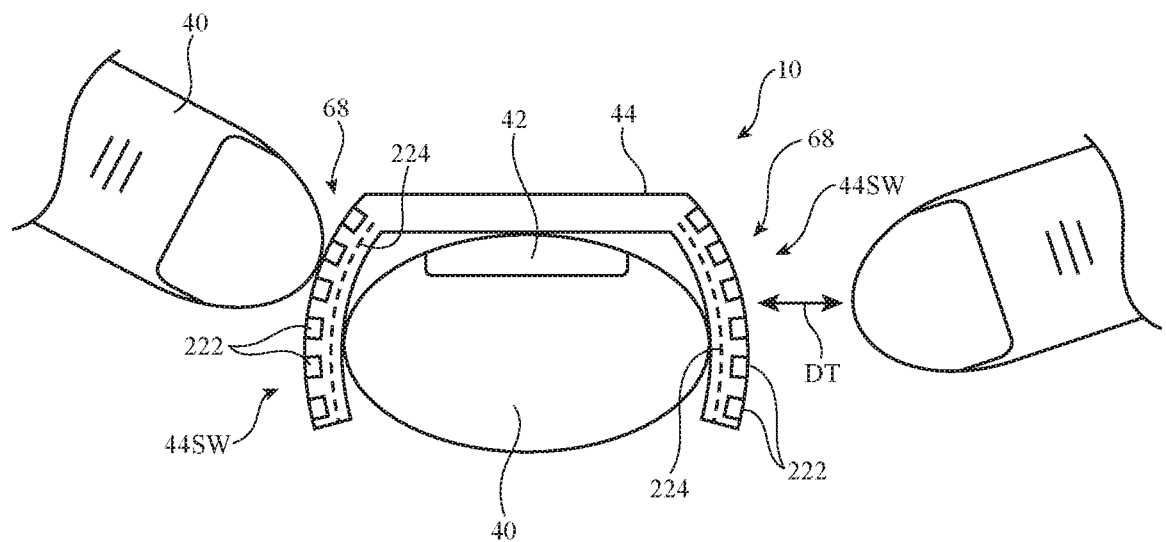
FIG. 23 is a front view of an illustrative finger device with curved sides showing how touch sensors and force sensors may be incorporated into the device in accordance with an embodiment.

FIG. 23 is a front view of an illustrative finger device with curved sides showing how touch sensors and force sensors may be incorporated into the device. As shown in FIG. 43, touch sensors 68 may be formed from two-dimensional arrays of capacitive touch sensor electrodes 222 or other suitable two-dimensional touch sensor components to provide device 10 with the ability to gather two-dimensional touch input (e.g., swipes, taps, and/or other touch finger input). Sidewalls (sides) 44SW of housing 44 may have curved cross-sectional profiles (e.g., sidewalls 44SW may be convex and may be bowed outwardly). This helps reduce the size of the contact patch between one or more of the user's fingers 40' and touch sensors 68 (e.g., the contact patch created when the user's fingers 40' touch the outside of sidewalls 44SW while device 10 is being worn on finger 40).

Other sensors 18 may also be formed on curved housing sidewalls. For example, force sensor circuitry 224 may, if desired, be incorporated into device 10 on sidewalls 44SW or elsewhere in housing 44 to gather force input from fingers 40' in addition to or instead of receiving touch input with touch sensors 68. For example, sensor circuitry 224 may use force sensitive resistors, force sensitive capacitive sensors (e.g., deformable parallel capacitor plates), strain gauges, or other force sensitive circuitry.

In some configurations, electrodes 222 may form part of a capacitive sensor that is configured to detect the presence of external objects such as finger 40' at a non-zero distance DT from the sensor (e.g., at distance DT of at least 0.2 mm, at least 1 mm, at least 5 mm, less than 15 mm, less than 7 mm, etc.). For example, electrodes 222 may form part of a self-capacitance capacitive sensor that detects when finger 40' is approaching the surface of sidewalls 44SW. This allows device 10 to prepare for the expected contact of finger 40' against the touch sensor on one of sidewalls 44SW and/or to detect and take action based on hovering gestures or other air gestures (e.g., finger movements at distance DT above the surface of the capacitive sensor). Non-capacitive sensors may also be used to detect non-contact hovering gestures (air gestures). For example, optical sensors, acoustic sensors, and/or other sensors can be used to monitor three-dimensional air gestures (movement of fingers 40' above the surfaces of device 10).

Figure 24:
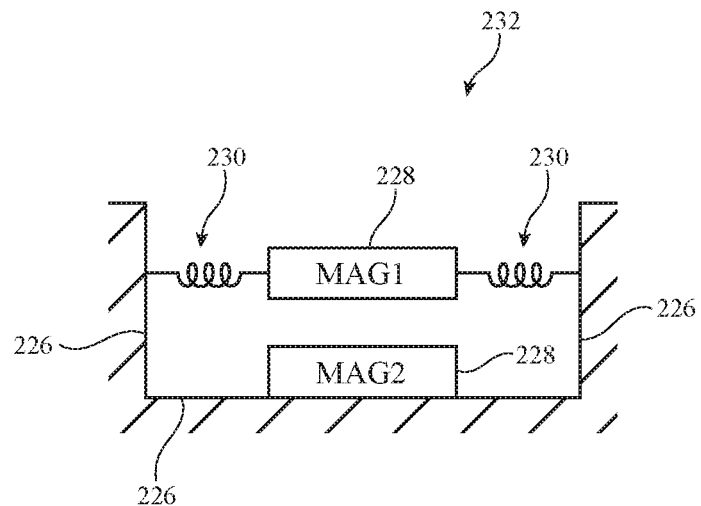
FIG. 24 is a side view of an illustrative haptic output device such as a linear resonant actuator in accordance with an embodiment.

FIG. 24 is a diagram of an illustrative linear resonant actuator that may be used in system 8. Linear resonant actuator 232 of FIG. 24 has magnets 228. Magnets 228 may include permanent magnets and/or electromagnets. Support structures 226 may be formed from metal, polymer, and/or other materials. A first of magnets 228 such as magnet MAG2 (e.g., a permanent magnet) may be attached to support structures 226. A second of magnets 228 such as magnet MAG1 (e.g., an electromagnet) may be coupled to support structures 226 by a mechanical system (see, e.g., springs 230) that allows magnet MAG1 to move relative to magnet MAG2 and that exhibits resonance. Linear resonant actuator 232 may be driven by applying an alternating-current drive signal to an electromagnet in magnets 228 (e.g., magnet MAG2). When driven with a waveform characterized by a frequency at or near the resonant frequency of actuator 232, actuator 232 may exhibit an enhanced vibrations and therefore an enhanced haptic output for the user of device 10. Linear resonant actuator 232 may be mounted in locations such as locations 46 of FIG. 3.

Figure 25:
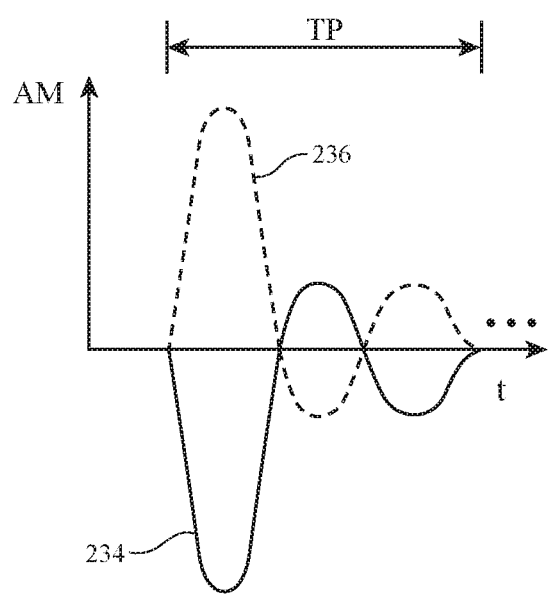
FIG. 25 is a graph of illustrative drive signals for a linear resonant actuator in accordance with an embodiment.

Haptic output devices such as linear resonant actuator 232 may be driven using any suitable drive signals. Illustrative drive signals that may be used are shown in FIG. 25. Drive signal amplitude AM versus time t is plotted for two illustrative drive signals in the graph of FIG. 25. The illustrative drive signals of FIG. 25 may be repeated for multiple periods TP (e.g., at a repetition frequency of 75 Hz, more than 75 Hz, or less than 75 Hz). The total duration over which the drive signal is applied to the linear resonant actuator 232 is equal to the total duration for which haptic output is desired (e.g., at least 0.2 s, at least 0.5 s, at least 1 s, less than 500 s, less than 50 s, less than 5 s, less than 0.8 s, etc.). As shown by illustrative drive waveform 234, within each period TP, linear resonant actuator 232 may be driven by a periodic oscillating waveform that decays over several oscillations. The frequency of the oscillations in this waveform may be selected to coincide with the resonant frequency of the linear resonant actuator.

The asymmetry of the oscillations within each period TP may impart directionality to the haptic effect experienced by the user. For example, waveform 234 may impart a feeling of force on finger 40 in a given direction, whereas waveform 236, which is the complement of waveform 234 may impart a feeling of force on finger 40 in a direction that is opposite to the given direction (as examples). Haptic output with frequency components in the 50-300 Hz range may be well suited for detection by humans (e.g., finger 40), but other frequency components may be present in the drive signal applied to linear resonant actuator 232, if desired. In some arrangements, there may be a tradeoff between directional feel and vibrational feel (i.e., drive signals that are asymmetric or otherwise configured to enhance a user's perception of directional force on finger 40 may tend to reduce the user's perception that finger 40 is vibrating and vice versa). Drive signals such as drive signals 234 and 236 of FIG. 25 may be configured to provide a desired mixture of directional feel and vibrational feel (e.g., by altering the shape of the decay envelope of the drive signal, by altering the oscillation frequency of the drive signal within each period TP, by altering the leading edge slope and/or the trailing edge slope of oscillations in the drive signal, by altering the degree of asymmetry within each oscillation and/or within each period TP, etc.).

As described above, one aspect of the present technology is the gathering and use of information such as sensor information. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, eyeglasses prescription, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A finger device operable with a head-mounted device that is configured to display virtual content over a real-world object, the finger device comprising:
   a housing configured to be coupled to a finger at a tip of the finger while leaving a finger pad at the tip of the finger exposed, wherein the finger device has a U-shaped housing having first and second sides coupled by a top portion;
   a haptic output device coupled to the housing;
   sensor circuitry coupled to the housing configured to gather finger position information as the finger interacts with the displayed virtual content, wherein the finger position information; and
   control circuitry in the housing configured to determine a finger position relative to the real-world object based on the finger position information and to provide haptic output to the finger using the haptic output device based on the finger position.

2. The finger device defined in claim 1 wherein the sensor circuitry includes an inertial measurement unit configured to gather the finger position information while a user is interacting with the real-world object that is overlapped by the virtual content.

3. The finger device defined in claim 1 wherein the sensor circuitry includes strain gauge circuitry configured to gather a force measurement associated with a force generated by the finger as the finger contacts a surface of the real-world object while interacting with the displayed virtual content.

4. The finger device defined in claim 1 wherein the sensor circuitry comprises an ultrasonic sensor.

5. The finger device defined in claim 1 wherein the sensor circuitry comprises an image sensor.

6. The finger device defined in claim 1 wherein the sensor circuitry comprises a depth sensor.

7. The finger device defined in claim 6 wherein the control circuitry is configured to provide the haptic output with the haptic output device while the finger is selecting an item in an interactive list in the virtual content.

8. The finger device defined in claim 1 wherein the real-world object does not contain circuitry and wherein the sensor circuitry is configured to gather the finger position information as the finger interacts with the displayed virtual content while simultaneously moving the real-world object.

9. The finger device defined in claim 1 wherein the control circuitry is configured to provide the finger with different textures in different areas of the real-world object by providing different haptic output to the finger in the different areas using the haptic output device based on the finger position information.

10. The finger device defined in claim 1 wherein the virtual content comprises a virtual object and wherein the control circuitry is configured to move the virtual object in response to the finger position information.

11. A finger device configured to be worn on a finger of a user, comprising:
- a housing configured to be coupled to a tip of the finger while leaving a finger pad at the tip of the finger exposed, wherein the housing has a top portion, first and second sides coupled to the top portion, and an elongated arm that extends from the first side toward the tip of the finger along a length of the finger;
- a haptic output device coupled to the housing;
- sensor circuitry configured to gather finger position information as the user moves the finger, wherein the sensor circuitry comprises a strain gauge on the elongated arm;
- a touch sensor configured to gather touch input along an exterior surface of the housing; and
- control circuitry configured to provide haptic output to the finger using the haptic output device based on the gathered touch input and the finger position information.

12. The finger device defined in claim 11 wherein the touch sensor includes an array of capacitive touch sensor electrodes extending along the housing, wherein the touch sensor is configured to gather the touch input from an additional finger touching the touch sensor, and wherein the control circuitry is configured to create haptic detents by providing the haptic output as the additional finger moves along the array of capacitive touch sensor electrodes.

13. The finger device defined in claim 11 wherein the housing is configured to receive the finger without covering a finger pad at a tip of the finger and wherein the touch sensor has an array of sensor elements that extend along the housing.

14. The finger device defined in claim 13 wherein the sensor circuitry comprises capacitive touch sensor electrodes.

15. The finger device defined in claim 14 wherein the sensor circuitry further comprises an additional sensor coupled to the housing that gathers information on interactions of the finger with external objects.

16. The finger device defined in claim 15 wherein the additional sensor coupled to the housing comprises an inertial measurement unit.

17. The finger device defined in claim 15 wherein the additional sensor coupled to the housing comprises an image sensor.

18. The finger device defined in claim 15 wherein the additional sensor coupled to the housing comprises a depth sensor.

19. The finger device defined in claim 13 wherein the sensor circuitry comprises sensor elements configured to gather touch input from an area on the finger that is adjacent to the housing and that is not overlapped by the housing.

20. The finger device defined in claim 13 wherein the sensor circuitry further comprises a force sensor configured to gather finger pinch input from the finger as the finger presses against another finger.

21. A finger device operable with a wireless electronic device and configured to be worn on a first finger of a user while receiving touch input from a second finger of the user, comprising:
- a housing configured to be coupled to the first finger, wherein the housing is a U-shaped housing having first and second sides coupled by a top portion;
- sensor circuitry to gather finger position information as the user moves the first finger;
- a touch sensor configured to gather touch input along an exterior surface of the housing from the second finger, wherein the touch input includes finger swipes and wherein the touch sensor is selected from the group consisting of: a capacitive sensor, an optical sensor, and an ultrasonic sensor; and
- control circuitry configured to wirelessly transmit the gathered touch input and finger position information to the wireless electronic device.

22. The finger device defined in claim 21 further comprising:
- a haptic output device configured to provide haptic output.

23. The finger device defined in claim 22 wherein the control circuitry is configured to use the haptic output device to create detents as the second finger moves along the touch sensor.

24. The finger device defined in claim 23 wherein the control circuitry is configured to use the haptic output device to provide the first finger with haptic output based on the finger input.

25. The finger device defined in claim 24 wherein the sensor circuitry comprises an accelerometer and wherein the finger input comprises finger motion sensed with the accelerometer.

26. The finger device defined in claim 24 wherein the sensor circuitry comprises an inertial measurement unit.

27. The finger device defined in claim 24 wherein the sensor circuitry comprises a force sensor.

28. The finger device defined in claim 24 wherein the sensor circuitry comprises an ultrasonic sensor.

29. The finger device defined in claim 24 wherein the sensor circuitry comprises an optical sensor.

30. The finger device defined in claim 24 wherein the housing is configured to be coupled to a tip of the first finger while leaving a finger pad at the tip of the first finger exposed.

31. The finger device defined in claim 30 wherein the touch sensor is configured to gather touch input on the first side, the second side, and the top portion.

32. The finger device defined in claim 21 wherein the wireless electronic device comprises a head-mounted device configured to display virtual content that overlaps the exterior surface as the touch sensor gathers the touch input.

33. The finger device defined in claim 21 wherein the housing has a bendable arm, wherein the sensor circuitry comprises a strain gauge on the bendable arm, and wherein the touch sensor overlaps the bendable arm.

34. A finger device operable with a wireless electronic device and configured to be worn on a first finger of a user while receiving touch input from a second finger of the user, comprising:
- a housing configured to be coupled to the first finger;
- sensor circuitry coupled to the housing configured to gather finger position information as the user moves the first finger, wherein the finger position information comprises a position of the first finger relative to the wireless electronic device;
- a sensor coupled to the housing configured to gather finger input from the second finger within a region on the first finger that is not overlapped by the housing;
- control circuitry coupled to the housing configured to wirelessly transmit the gathered finger input and the finger position information to the wireless electronic device; and
- first, second, and third directional radio-frequency sensors, wherein the control circuitry is configured to gather information on an orientation of the first finger from the first, second, and third directional radio-frequency sensors.

35. The finger device defined in claim 34 wherein the first, second, and third directional radio-frequency sensors are orthogonal.

36. The finger device defined in claim 34 wherein the housing has a portion that protrudes in front of a finger tip portion of the first finger, and wherein the sensor circuitry is on the portion that protrudes in front of the finger tip.

37. A finger device operable with a computer having a display that displays virtual content, the finger device comprising:
 a housing configured to be worn on a finger of a user;
 a haptic output device;
 a sensor coupled to the housing configured to gather finger position information and user input as the finger of the user touches the display to interact with the virtual content;
 wireless communications circuitry configured to transmit the user input and the finger position information to the computer; and
 control circuitry in the housing configured to process the finger position information to produce processed finger position information and to use the haptic output device to provide haptic output to the finger of the user based on the processed finger position information.

38. The finger device defined in claim 37 wherein the computer comprises a tablet computer.

39. The finger device defined in claim 38 further comprising:
 a touch sensor configured to gather touch input along an exterior surface of the housing, wherein the control circuitry is configured to provide haptic output to the finger using the haptic output device based on the gathered touch input.

40. The finger device defined in claim 37 wherein the computer comprises a desktop computer.

41. The finger device defined in claim 40 further comprising:
 a touch sensor configured to gather touch input along an exterior surface of the housing, wherein the control circuitry is configured to provide haptic output to the finger using the haptic output device based on the gathered touch input.

42. An electronic device operable with a finger device that is configured to be worn on a finger of a hand of a user and that has a housing, a haptic output device coupled to the housing, a sensor coupled to the housing and configured to gather user input in response to the user touching an external object and finger position information, and finger device control circuitry in the housing configured to determine a finger position based on the finger position information and to provide haptic output to the finger using the haptic output device based on the finger position, the electronic device comprising:
 a display configured to display virtual content;
 a hand-tracking system configured to measure movement of the hand of the user as the user touches the external object and interacts with the virtual content;
 wireless communications circuitry configured to receive user input gathered with the sensor in the finger device in response to the user touching the external object and interacting with the virtual content and to receive the finger position determined by the finger device control circuitry; and
 electronic device control circuitry configured to move an object on the display in response to the measured movement of the hand and in response to the user input.

* * * * *